United States Patent
Nanda et al.

(10) Patent No.: US 8,903,440 B2
(45) Date of Patent: Dec. 2, 2014

(54) DISTRIBUTED HIERARCHICAL SCHEDULING IN AN AD HOC NETWORK

(75) Inventors: Sanjiv Nanda, San Diego, CA (US); J. Rodney Walton, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 1039 days.

(21) Appl. No.: 12/882,945

(22) Filed: Sep. 15, 2010

(65) Prior Publication Data

US 2011/0223952 A1 Sep. 15, 2011

Related U.S. Application Data

(63) Continuation of application No. 11/044,539, filed on Jan. 26, 2005, now Pat. No. 7,818,018.

(60) Provisional application No. 60/540,504, filed on Jan. 29, 2004.

(51) Int. Cl.
*H04B 7/00* (2006.01)
*H04W 72/12* (2009.01)
*H04W 84/18* (2009.01)

(52) U.S. Cl.
CPC ...... *H04W 72/1278* (2013.01); *H04W 72/1231* (2013.01); *H04W 84/18* (2013.01)
USPC ........... 455/509; 455/450; 455/507; 455/512; 455/67.11; 455/426.1; 370/278; 370/246; 370/406; 370/408; 370/400

(58) Field of Classification Search
CPC .............................. H04W 84/18; H04W 84/00
USPC ......... 455/509, 507, 508, 512, 513, 515, 500, 455/517, 524, 525, 450–453.2, 446, 445, 455/422.1, 403, 426.1, 426.2, 67.11, 455/423–425; 370/278, 246, 276, 282, 277, 370/310, 328, 329, 338, 343, 406, 408, 400, 370/389
See application file for complete search history.

(56) References Cited

U.S. PATENT DOCUMENTS

| | | |
|---|---|---|
| 4,536,874 A | 8/1985 | Stoffel et al. |
| 4,747,100 A | 5/1988 | Roach et al. |

(Continued)

FOREIGN PATENT DOCUMENTS

| | | |
|---|---|---|
| CN | 1315096 A | 9/2001 |
| CN | 1316146 A | 10/2001 |

(Continued)

OTHER PUBLICATIONS

Ketchum J., et al., High-Throughput Enhancements for 802.11: Features and Performance of QUALCOMM's Proposal, IEEE 802.11-04/0873r2, IEEE mentor, Sep. 16, 2004.

(Continued)

*Primary Examiner* — Keith Ferguson
(74) *Attorney, Agent, or Firm* — Qualcomm IP Department; James Hunt Yancey, Jr.

(57) ABSTRACT

An ad hoc network with distributed hierarchical scheduling is disclosed. In one aspect, stations in a network mesh detect interfering neighbor stations and form interference lists. Stations transmit their interference lists. Scheduling stations schedule allocations for child stations in response to interference lists, received remote allocations, or a combination thereof. Coordination messages are transmitted including frame structure, allocations, and interference lists, among others. In another aspect, an ad hoc mesh network may be organized into a tree topology. In an example wireless backhaul network, this matches traffic flow. Distributed, hierarchical scheduling is provided where parents schedule communication with children while respecting already scheduled transmissions to/from interferers and to/from interferers of their respective children. Procedures to construct interference constraints for distributed, hierarchical scheduling are described, resulting in efficient scheduling and reuse in an ad hoc wireless network, without centralized scheduling. Various other aspects are also disclosed.

33 Claims, 14 Drawing Sheets

(56) References Cited

U.S. PATENT DOCUMENTS

| | | |
|---|---|---|
| 4,750,171 A | 6/1988 | Kedar et al. |
| 4,819,229 A | 4/1989 | Pritty et al. |
| 5,081,623 A | 1/1992 | Ainscow |
| 5,133,081 A | 7/1992 | Mayo |
| 5,274,841 A | 12/1993 | Natarajan et al. |
| 5,276,703 A | 1/1994 | Budin et al. |
| 5,280,476 A | 1/1994 | Kojima et al. |
| 5,297,144 A | 3/1994 | Gilbert et al. |
| 5,384,777 A | 1/1995 | Ahmadi et al. |
| 5,444,702 A | 8/1995 | Burnett et al. |
| 5,493,569 A | 2/1996 | Buchholz et al. |
| 5,634,006 A | 5/1997 | Baugher et al. |
| 5,638,371 A | 6/1997 | Raychaudhuri et al. |
| 5,677,909 A | 10/1997 | Heide |
| 5,684,791 A | 11/1997 | Raychaudhuri et al. |
| 5,719,868 A | 2/1998 | Young |
| 5,729,542 A | 3/1998 | Dupont |
| 5,751,719 A | 5/1998 | Chen et al. |
| 5,818,842 A | 10/1998 | Burwell et al. |
| 5,914,950 A | 6/1999 | Tiedemann, Jr. et al. |
| 5,923,650 A | 7/1999 | Chen et al. |
| 5,946,313 A | 8/1999 | Allan et al. |
| 5,970,059 A | 10/1999 | Ahopelto et al. |
| 5,974,045 A | 10/1999 | Ohkura et al. |
| 6,002,691 A | 12/1999 | Citta et al. |
| 6,014,087 A | 1/2000 | Krishnakumar et al. |
| 6,049,528 A | 4/2000 | Hendel et al. |
| 6,069,886 A | 5/2000 | Ayerst et al. |
| 6,098,142 A | 8/2000 | Leggett et al. |
| 6,111,927 A | 8/2000 | Sokoler |
| 6,130,886 A | 10/2000 | Ketseoglou et al. |
| 6,167,056 A | 12/2000 | Miller et al. |
| 6,252,854 B1 | 6/2001 | Hortensius et al. |
| 6,256,317 B1 | 7/2001 | Holloway et al. |
| 6,307,846 B1 | 10/2001 | Willey |
| 6,317,435 B1 | 11/2001 | Tiedemann, Jr. et al. |
| 6,404,751 B1 | 6/2002 | Roark et al. |
| 6,433,737 B2 | 8/2002 | Katz |
| 6,438,104 B1 | 8/2002 | Fodor et al. |
| 6,452,917 B1 | 9/2002 | Leung |
| 6,456,599 B1 | 9/2002 | Elliott |
| 6,473,467 B1 | 10/2002 | Wallace et al. |
| 6,483,819 B1 | 11/2002 | Take et al. |
| 6,504,506 B1 | 1/2003 | Thomas et al. |
| 6,512,773 B1 | 1/2003 | Scott |
| 6,522,650 B1 | 2/2003 | Yonge, III |
| 6,532,225 B1 | 3/2003 | Chang et al. |
| 6,542,490 B1 | 4/2003 | Ahmadvand et al. |
| 6,553,020 B1 | 4/2003 | Hughes et al. |
| 6,563,816 B1 | 5/2003 | Nodoushani et al. |
| 6,574,237 B1 | 6/2003 | Bullman et al. |
| 6,580,704 B1 | 6/2003 | Wellig et al. |
| 6,587,441 B1 | 7/2003 | Urban et al. |
| 6,600,754 B1 | 7/2003 | Young et al. |
| 6,609,866 B2 | 8/2003 | Huang et al. |
| 6,611,525 B1 | 8/2003 | Natanson et al. |
| 6,611,529 B1 | 8/2003 | Krishnakumar et al. |
| 6,621,805 B1 | 9/2003 | Kondylis et al. |
| 6,621,827 B1 | 9/2003 | Rezvani et al. |
| 6,625,171 B1 | 9/2003 | Matsudo |
| 6,625,172 B2 | 9/2003 | Odenwalder et al. |
| 6,633,564 B1 | 10/2003 | Steer et al. |
| 6,643,260 B1 | 11/2003 | Kloth et al. |
| 6,671,511 B1 | 12/2003 | Forssell et al. |
| 6,724,740 B1 | 4/2004 | Choi et al. |
| 6,741,635 B2 | 5/2004 | Lo et al. |
| 6,751,187 B2 | 6/2004 | Walton et al. |
| 6,751,623 B1 | 6/2004 | Basso et al. |
| 6,760,388 B2 | 7/2004 | Ketchum et al. |
| 6,768,730 B1 | 7/2004 | Whitehill |
| 6,771,706 B2 | 8/2004 | Ling et al. |
| 6,788,702 B1 | 9/2004 | Garcia-Luna-Aceves et al. |
| 6,791,962 B2 | 9/2004 | Wentink |
| 6,791,996 B1 | 9/2004 | Watanabe et al. |
| 6,791,997 B2 | 9/2004 | Beyer et al. |
| 6,795,409 B1 | 9/2004 | Youssefmir et al. |
| 6,795,418 B2 | 9/2004 | Choi |
| 6,795,419 B2 | 9/2004 | Parantainen et al. |
| 6,813,260 B1 | 11/2004 | Fogle |
| 6,816,503 B1 | 11/2004 | Hashimoto et al. |
| 6,847,626 B1 | 1/2005 | Carneal et al. |
| 6,868,133 B2 | 3/2005 | Hicks et al. |
| 6,898,441 B1 | 5/2005 | Kogiantis et al. |
| 6,907,020 B2 | 6/2005 | Periyalwar et al. |
| 6,912,225 B1 | 6/2005 | Kohzuki et al. |
| 6,934,275 B1 | 8/2005 | Love et al. |
| 6,944,688 B1 | 9/2005 | Batcher |
| 6,961,311 B2 | 11/2005 | Rakotoarivelo et al. |
| 6,963,549 B1 | 11/2005 | Jayaraman et al. |
| 6,977,944 B2 | 12/2005 | Brockmann et al. |
| 6,980,541 B2 * | 12/2005 | Shvodian ..................... 370/346 |
| 7,006,500 B1 | 2/2006 | Pedersen et al. |
| 7,006,848 B2 | 2/2006 | Ling et al. |
| 7,031,274 B2 | 4/2006 | Sherman |
| 7,031,287 B1 | 4/2006 | Ho et al. |
| 7,046,639 B2 | 5/2006 | Garcia-Luna-Aceves et al. |
| 7,046,654 B2 | 5/2006 | Chen |
| 7,046,690 B2 | 5/2006 | Sherman |
| 7,050,759 B2 | 5/2006 | Gaal et al. |
| 7,058,074 B2 | 6/2006 | Ho et al. |
| 7,065,144 B2 | 6/2006 | Walton et al. |
| 7,068,633 B1 | 6/2006 | Ho |
| 7,079,552 B2 | 7/2006 | Cain et al. |
| 7,082,117 B2 | 7/2006 | Billhartz |
| 7,085,281 B2 | 8/2006 | Thomas et al. |
| 7,092,737 B2 | 8/2006 | Horng et al. |
| 7,095,732 B1 | 8/2006 | Watson, Jr. |
| 7,099,300 B2 | 8/2006 | Sugaya |
| 7,099,671 B2 | 8/2006 | Liang |
| 7,116,652 B2 | 10/2006 | Lozano |
| 7,120,134 B2 | 10/2006 | Tiedemann, Jr. et al. |
| 7,123,627 B2 | 10/2006 | Kowalski |
| 7,130,289 B2 | 10/2006 | Kuan et al. |
| 7,142,527 B2 | 11/2006 | Garcia-Luna-Aceves |
| 7,145,895 B2 | 12/2006 | Mueckenheim et al. |
| 7,149,245 B2 | 12/2006 | Budka et al. |
| 7,154,876 B2 | 12/2006 | Benveniste |
| 7,158,504 B2 | 1/2007 | Kadaba et al. |
| 7,158,803 B1 | 1/2007 | Elliott |
| 7,187,691 B2 | 3/2007 | Gavette |
| 7,203,192 B2 | 4/2007 | Desai et al. |
| 7,206,083 B2 | 4/2007 | Shimada |
| 7,236,459 B1 | 6/2007 | Okholm et al. |
| 7,237,036 B2 | 6/2007 | Boucher et al. |
| 7,260,073 B2 | 8/2007 | Sipola |
| 7,263,083 B2 | 8/2007 | Kisigami et al. |
| 7,266,087 B2 | 9/2007 | Wahl |
| 7,269,152 B2 | 9/2007 | Vukovic et al. |
| 7,274,707 B2 | 9/2007 | Choi et al. |
| 7,277,149 B2 | 10/2007 | Kim et al. |
| 7,277,419 B2 | 10/2007 | McGowan |
| 7,277,430 B2 | 10/2007 | Ono et al. |
| 7,280,513 B2 | 10/2007 | Cao et al. |
| 7,284,260 B2 | 10/2007 | Hilts et al. |
| 7,301,924 B1 | 11/2007 | Gurbuz et al. |
| 7,301,944 B1 | 11/2007 | Redmond |
| 7,313,104 B1 | 12/2007 | Kern et al. |
| 7,324,429 B2 | 1/2008 | Walton et al. |
| 7,330,877 B2 | 2/2008 | Kandala |
| 7,333,556 B2 | 2/2008 | Maltsev et al. |
| 7,336,642 B2 | 2/2008 | Rich et al. |
| 7,342,940 B2 | 3/2008 | Park |
| 7,366,202 B2 | 4/2008 | Scherzer et al. |
| 7,372,855 B2 | 5/2008 | Kandala |
| 7,400,641 B2 | 7/2008 | Nitschke et al. |
| 7,400,642 B2 | 7/2008 | Koo et al. |
| 7,417,974 B2 | 8/2008 | Hansen |
| 7,440,573 B2 | 10/2008 | Lor et al. |
| 7,450,550 B2 | 11/2008 | Jin |
| 7,512,070 B2 | 3/2009 | Stephens |
| 7,525,994 B2 | 4/2009 | Scholte |
| 7,564,814 B2 | 7/2009 | Abraham et al. |
| 7,570,656 B2 | 8/2009 | Raphaeli et al. |
| 7,599,334 B2 | 10/2009 | Odenwalder et al. |

(56) References Cited

U.S. PATENT DOCUMENTS

| | | |
|---|---|---|
| 7,599,340 B2 | 10/2009 | Chandra et al. |
| 7,633,946 B2 | 12/2009 | Pavon et al. |
| 7,639,657 B1 | 12/2009 | Ho et al. |
| 7,676,236 B2 | 3/2010 | Nanda et al. |
| 7,706,399 B2 | 4/2010 | Janczak |
| 7,724,721 B2 | 5/2010 | Lim et al. |
| 7,818,018 B2 | 10/2010 | Nanda et al. |
| 7,869,355 B2 | 1/2011 | Kodama et al. |
| 7,869,432 B1 | 1/2011 | Mollyn |
| 7,881,340 B2 | 2/2011 | Farrag et al. |
| 7,894,538 B2 | 2/2011 | Walton et al. |
| 7,961,705 B2 | 6/2011 | Kennedy et al. |
| 8,089,888 B2 | 1/2012 | Krishnamurthi et al. |
| 8,121,296 B2 | 2/2012 | Hawkes et al. |
| 8,233,462 B2 | 7/2012 | Walton et al. |
| 8,315,271 B2 | 11/2012 | Nanda et al. |
| 8,355,372 B2 | 1/2013 | Abraham et al. |
| 8,401,018 B2 | 3/2013 | Meylan et al. |
| 8,462,817 B2 | 6/2013 | Ketchum et al. |
| 8,472,473 B2 | 6/2013 | Ketchum et al. |
| 8,483,105 B2 | 7/2013 | Nanda et al. |
| 2001/0043576 A1 | 11/2001 | Terry |
| 2001/0046220 A1 | 11/2001 | Koo et al. |
| 2001/0053695 A1 | 12/2001 | Wallentin |
| 2002/0009999 A1 | 1/2002 | Lee et al. |
| 2002/0021698 A1 | 2/2002 | Lee et al. |
| 2002/0022483 A1 | 2/2002 | Thompson et al. |
| 2002/0046257 A1 | 4/2002 | Killmer |
| 2002/0093929 A1 | 7/2002 | Mangold et al. |
| 2002/0110101 A1 | 8/2002 | Gopalakrishnan et al. |
| 2002/0172186 A1 | 11/2002 | Larsson |
| 2002/0174219 A1 | 11/2002 | Mei et al. |
| 2003/0050084 A1 | 3/2003 | Damnjanovic et al. |
| 2003/0060207 A1 | 3/2003 | Sugaya et al. |
| 2003/0072280 A1 | 4/2003 | McFarland et al. |
| 2003/0087605 A1 | 5/2003 | Das et al. |
| 2003/0125040 A1 | 7/2003 | Walton et al. |
| 2003/0128684 A1 | 7/2003 | Hirsch et al. |
| 2003/0133441 A1 | 7/2003 | Watanabe et al. |
| 2003/0147385 A1 | 8/2003 | Montalvo et al. |
| 2003/0162519 A1 | 8/2003 | Smith et al. |
| 2003/0169697 A1 | 9/2003 | Suzuki et al. |
| 2003/0198312 A1 | 10/2003 | Budka et al. |
| 2003/0223365 A1 | 12/2003 | Kowalski |
| 2004/0017823 A1 | 1/2004 | Kim et al. |
| 2004/0022213 A1 | 2/2004 | Choi et al. |
| 2004/0023621 A1 | 2/2004 | Sugar et al. |
| 2004/0042556 A1 | 3/2004 | Medvedev et al. |
| 2004/0047319 A1 | 3/2004 | Elg |
| 2004/0063455 A1 | 4/2004 | Eran et al. |
| 2004/0082356 A1 | 4/2004 | Walton et al. |
| 2004/0109433 A1 | 6/2004 | Khan |
| 2004/0110538 A1 | 6/2004 | Doi |
| 2004/0120349 A1 | 6/2004 | Border et al. |
| 2004/0125778 A1 | 7/2004 | Lin et al. |
| 2004/0141522 A1 | 7/2004 | Texerman et al. |
| 2004/0151199 A1 | 8/2004 | Sykes et al. |
| 2004/0156345 A1 | 8/2004 | Steer et al. |
| 2004/0156367 A1 | 8/2004 | Albuquerque et al. |
| 2004/0163129 A1 | 8/2004 | Chapman et al. |
| 2004/0184427 A1 | 9/2004 | Lynch et al. |
| 2004/0184567 A1 | 9/2004 | McDonough et al. |
| 2004/0204101 A1 | 10/2004 | Qiu et al. |
| 2004/0246934 A1 | 12/2004 | Kim |
| 2004/0258091 A1 | 12/2004 | Meyer et al. |
| 2004/0266451 A1 | 12/2004 | Stolyar et al. |
| 2005/0003794 A1 | 1/2005 | Liu |
| 2005/0036475 A1 | 2/2005 | Nishiyama et al. |
| 2005/0053064 A1 | 3/2005 | Wang |
| 2005/0058078 A1 | 3/2005 | Jung et al. |
| 2005/0111462 A1 | 5/2005 | Walton et al. |
| 2005/0135318 A1 | 6/2005 | Walton et al. |
| 2005/0135403 A1 | 6/2005 | Ketchum et al. |
| 2005/0152314 A1 | 7/2005 | Sun et al. |
| 2005/0157729 A1 | 7/2005 | Rabie et al. |
| 2005/0239407 A1 | 10/2005 | Foore et al. |
| 2005/0270975 A1 | 12/2005 | Meylan et al. |
| 2006/0092871 A1 | 5/2006 | Nishibayashi et al. |
| 2006/0099956 A1 | 5/2006 | Harada et al. |
| 2006/0159123 A1 | 7/2006 | Fleury et al. |
| 2006/0164969 A1 | 7/2006 | Malik et al. |
| 2006/0165021 A1 | 7/2006 | Tian et al. |
| 2006/0189352 A1 | 8/2006 | Nagai et al. |
| 2006/0193294 A1 | 8/2006 | Jorswieck et al. |
| 2006/0227801 A1 | 10/2006 | Nanda et al. |
| 2006/0268886 A1 | 11/2006 | Sammour et al. |
| 2007/0037548 A1 | 2/2007 | Sammour et al. |
| 2007/0037564 A1 | 2/2007 | Imamura et al. |
| 2007/0058543 A1 | 3/2007 | Fenart et al. |
| 2007/0058605 A1 | 3/2007 | Meylan et al. |
| 2007/0097945 A1 | 5/2007 | Wang et al. |
| 2007/0230338 A1 | 10/2007 | Shao et al. |
| 2008/0130660 A1 | 6/2008 | Ros-Giralt et al. |
| 2008/0267123 A1 | 10/2008 | Zeira et al. |
| 2009/0097444 A1 | 4/2009 | Lohr et al. |
| 2009/0103558 A1 | 4/2009 | Zangi et al. |
| 2009/0116434 A1 | 5/2009 | Lohr et al. |
| 2009/0252145 A1 | 10/2009 | Meylan et al. |
| 2009/0323646 A1 | 12/2009 | Ketchum et al. |
| 2010/0246603 A1 | 9/2010 | Rabie et al. |
| 2010/0290423 A1 | 11/2010 | Hwang et al. |
| 2010/0309872 A1 | 12/2010 | Amini et al. |
| 2011/0182231 A1 | 7/2011 | Wang et al. |
| 2012/0188973 A1 | 7/2012 | Meylan et al. |
| 2012/0263137 A1 | 10/2012 | Walton et al. |
| 2012/0287856 A1 | 11/2012 | Ketchum et al. |
| 2013/0034076 A1 | 2/2013 | Ketchum et al. |
| 2013/0070715 A1 | 3/2013 | Nanda et al. |
| 2013/0230038 A1 | 9/2013 | Walton et al. |
| 2013/0242916 A1 | 9/2013 | Meylan et al. |
| 2013/0287043 A1 | 10/2013 | Nanda et al. |

FOREIGN PATENT DOCUMENTS

| | | |
|---|---|---|
| CN | 1423464 A | 6/2003 |
| CN | 1478362 A | 2/2004 |
| EP | 0475682 A2 | 3/1992 |
| EP | 0782360 A2 | 7/1997 |
| EP | 0912016 A2 | 4/1999 |
| EP | 1052855 A2 | 11/2000 |
| EP | 1089500 A2 | 4/2001 |
| EP | 1182900 A1 | 2/2002 |
| EP | 1187406 A1 | 3/2002 |
| EP | 1261183 A1 | 11/2002 |
| EP | 1317110 A1 | 6/2003 |
| EP | 1429494 A1 | 6/2004 |
| EP | 1463217 A1 | 9/2004 |
| JP | 2226828 | 10/1990 |
| JP | 2000174820 A | 6/2000 |
| JP | 2001024573 A | 1/2001 |
| JP | 2001160813 A | 6/2001 |
| JP | 2001160843 A | 6/2001 |
| JP | 2001507907 T | 6/2001 |
| JP | 2001217768 A | 8/2001 |
| JP | 2001522211 | 11/2001 |
| JP | 2003060564 A | 2/2003 |
| JP | 2003060655 | 2/2003 |
| JP | 2003078565 | 3/2003 |
| JP | 2003143644 A | 5/2003 |
| JP | 2003163669 A | 6/2003 |
| JP | 2003249939 A | 9/2003 |
| JP | 2003258807 A | 9/2003 |
| JP | 2003528507 A | 9/2003 |
| JP | 2003289309 A | 10/2003 |
| JP | 2003289576 A | 10/2003 |
| JP | 2005020163 A | 1/2005 |
| JP | 2005505148 T | 2/2005 |
| JP | 2005057373 A | 3/2005 |
| JP | 2005094156 A | 4/2005 |
| KR | 20030036847 | 5/2003 |
| KR | 20040076979 A | 9/2004 |
| WO | 9625811 A1 | 8/1996 |
| WO | 9905881 A1 | 2/1999 |
| WO | WO-9925080 A1 | 5/1999 |

(56) References Cited

FOREIGN PATENT DOCUMENTS

| WO | 9957931 A1 | 11/1999 |
|---|---|---|
| WO | 0052880 A2 | 9/2000 |
| WO | 0056113 A1 | 9/2000 |
| WO | 0064111 A1 | 10/2000 |
| WO | 0119032 A1 | 3/2001 |
| WO | 0128170 A2 | 4/2001 |
| WO | 0171928 A2 | 9/2001 |
| WO | 0172081 | 9/2001 |
| WO | 0201732 A2 | 1/2002 |
| WO | 0228119 A2 | 4/2002 |
| WO | 0233582 | 4/2002 |
| WO | 0233852 A2 | 4/2002 |
| WO | 0235873 A2 | 5/2002 |
| WO | 02061969 A1 | 8/2002 |
| WO | 02082751 A2 | 10/2002 |
| WO | 02093843 A1 | 11/2002 |
| WO | 02100064 A2 | 12/2002 |
| WO | 03032526 A1 | 4/2003 |
| WO | 03034642 A2 | 4/2003 |
| WO | 03039074 A1 | 5/2003 |
| WO | 03041297 A1 | 5/2003 |
| WO | 03041343 A2 | 5/2003 |
| WO | 03047176 A1 | 6/2003 |
| WO | 03069857 A1 | 8/2003 |
| WO | 03107577 A2 | 12/2003 |
| WO | 2004030287 A2 | 4/2004 |
| WO | WO-2004039009 A1 | 5/2004 |

OTHER PUBLICATIONS

Ketchum J., et al., "System Description and Operating Principles for High Throughput Enhancements to 802.11", IEEE 802.11-04/0870r3, IEEE mentor, Jan. 16, 2005.
Mujtaba S., "TGn Sync Proposal Technical Specification," TGn Sync, 2004, IEEE 802.11-04/889r1.
Nanda S., et al., "MAC Enhancements for 802.11n", IEEE 802.11-04/0717r0, IEEE mentor, Jul. 12, 2004.
3GPP TS 25.211 'Physical channels and mapping of transport channels onto physical channels (FDD). Release 5, V5.0.0, Mar. 2002.
3GPP TS 25.212 v6.0.0 (Dec. 2003) Technical Specification Group Radio Access Network;Multiplexing and Channel Coding (FDD) (Release 6).
3GPP TS 25.213 V6.0.0 (Dec. 2003): 3rd Generation Partnership Project; Technical Specification Group Radio Access Network; Spreading and modulation (FDD)(Release 6).
3GPP TS 25.214 v6.0.0 (Dec. 2003) Technical Specification Group Radio Access Network; Physical Layer Procedures (FDD) (Release 6).
3GPP2 C.S000-2-C. "Physical Layer Standard for cdma2000 Spread Spectrum Systems", version 1.0, Release C, May 28, 2002.
3GPP2 TS 25.211: "Physical channels and mapping of transport channels onto physical channels (FDD)", Release 6, V.6.0.0, Dec. 2003.
3GPP2 TS 25.213: "Spreading and modulation (FDD)", Release 5, V5.6.0, Jun. 2005.
3GPP2 TS 25.214: "Physical layer procedures (FDD)", Release 5, V5.11.0, Jun. 2005.
3rd Generation Partnership Project; Technical Specification Group Radio Access Network; Multiplexing and channel coding (FDD); 3GPP TS 25.212 V5.10.0 (Jun. 2005) Release 5.
"A Wireless Token Ring Protocol for Ad-Hoc Networks," IEEE Aerospace Conference Proceedings, 2002. vol. 3, pp. 6-1219 to 3-1228. Mar. 9-16, 2002.
CDMA2000 High Rate Packet Data Air Interface Specification, TIA/EIA/IS-856, Nov. 2000, pp. 1-450.
Cheng Chen J., "A Comparison of MAC Protocols for Wireless Local Networks Based on Battery Power Consumption", INFOCOM '98. Seventeenth Annual Joint Conference of the IEEE Computer and Communications Societies. Proceedings, IEEE, IEEE, Apr. 2, 1998, vol. 1, p. 150-157.
Edfors et al., "OFDM Channel Estimation by Singular Value Decomposition," IEEE Transactions on Communications, 46(7):931-939, (Jul. 1998).
ETSI TS 125 211 v5.0.0 Release 5 (Mar. 2002), Universal Mobile Telecommunications System (UMTS); Physical Channels and Mapping of Transport Channels onto Physical Channels (FDD).
ETSI TS 125 211 v5.1.0; "Universal Mobile Telecommunications System (UMTS); Physical channels and mapping of transport channels onto physical channels (FDD)", 3GPP TS 25.211 version 5.1.0 Release 5 (Jun. 2002).
ETSI TS 125 211 v5.6.0; "Universal Mobile Telecommunications System (UMTS); Physical channels and mapping of transport channels onto physical channels (FDD)", 3GPP TS 25.211 version 5.6.0 Release 5 (Sep. 2004).
ETSI TS 125 212 v6.2.0; "Universal Mobile Telecommunications System (UMTS); Multiplexing and channel coding (FDD)", 3G TS 25.212 version 6.2.0 Release 6 (Jun. 2004).
ETSI TS 125 213 v6.0.0; "Universal Mobile Telecommunications System (UMTS); Spreading and modulation (FDD)", 3G TS 25.213 version 6.0.0 Release 6 (Dec. 2003).
ETSI TS 125 214 v6.3.0; "Universal Mobile Telecommunications System (UMTS); Physical layer procedures (FDD)", 3G TS 25.214 version 6.3.0 Release 6 (Sep. 2004).
Fang, J.C., et al., "A synchronous, reservation based medium access control protocol for multihop wireless networks", Wireless Communications and Networking, 2003, WCNC 2003. 2003 IEEE, IEEE, Mar. 20, 2003, vol. 2, p. 994-998.
Fu J., et al., "The Largest Eigenvalue Characteristics for MIMO Channel with Spatial Correlation in Multipath Fading", Technical Report of the Institute of Electronics, Information and Communication Engineers, Feb. 27, 2003, vol. 102, No. 681, pp. 171-178, RCS 2002-334.
Gyasi-Agyei A., et al., "GPRS-Features and Packet Random Access Channel Performance Analysis", Networks, 2000. (ICON 2000). Proceedings. IEEE International Conference on, IEEE, Dec. 31, 2000, p. 13-17.
IEEE Std 802.11a-1999 (Supplement to IEEE Std 801.Nov. 1999) "Part 11: Wireless LAN Medium Access Control (MAC) and Physical Layer (PHY) specifications: High-Speed physical Layer in the 5GHZ Band", pp. 1-90, Sep. 1999.
IEEE Std. 802.11b Supplement to IEEE Standard for Information technology—Telecommunications and information exchange between systems—Local and metropolitan area networks—Specific requirements—Part 11: Wireless LAN Medium Access Control (MAC) and Physical Layer (PHY) Specifications: Higher-Speed Physical Layer Extension in the 2.4 GHz Band, LAN/MAN Standards Committee of the IEEE Computer Society, Sep. 16, 1999.
IEEE Std. 802.11g IEEE Standard for Information technology—Telecommunications and information exchange between systems—Local and metropolitan area networks—Specific requirements—Part 11: Wireless LAN Medium Access Control (MAC) and Physical Layer (PHY) Specifications, Amendment 4: Further Higher Data Rate Extension in the 2.4 GHz Band, LAN/MAN Standards Committee IEEE Computer Society Jun. 27, 2003, pp. i-x & 1-67.
International Search Report—PCT/US05/003576, International Search Authority—European Patent Office—Jul. 28, 2005.
Ivrlac M. T., et al.,"Efficient Use of Fading Correlations in MIMO Systems", Vehicular Technology Conference, 2001, VTC 2001 Fall, vol. 4, pp. 2763-2767.
John Ketchum, et al., "High-Throughput Enhancements for 802.11: Features and Performance of QUALCOMM's Proposal", IEEE802.11-04/0873r1, IEEE mentor, Aug. 13, 2004, slide 58-66.
Kuehnel, Thomas, "Wireless Multimedia Enhancements (WME)", 11-03-0504-01-000e, IEEE mentor, Jul. 23, 2003, paragraph 3.4.3.
Mangold, et al., "IEEE 802.11e Wireless LAN for Quality of Service," Feb. 2002, pp. 1-8, XP002251598.
"MIMO-related Technology," Collection of Standard Technologies of the Japan Patent Office, May 25, 2005, 1-1-1, 1-1-3, URL; http://www.jpo.go.jp/shiryou/s_sonota/hyoujun_gijutsu/mimo/mokuji.htm.
Miyashita, K. et al. "Eigenbeam Space Division Multiplexing (E-SDM) in a MIMO Channel", Technical Research Report by Elec-

(56) References Cited

OTHER PUBLICATIONS tric Information Communication Academic Conference, May 17, 2002, vol. 102, No. 86, pp. 13-18, RCS2002-53.

Mujtaba, "TGn Sync Proposal Technical Specification," IEEE Wireless LANS, IEEE 802.11-04/0899r5, May 2005, pp. 1-134.

Seung et al., : "Multi-Stage Partial PIC Receivers for Multi-Rate DS-CDMA System with Multiple Modulation", IEEE 2003, pp. 591-594, Mar. 20, 2003.

Sheu, Shiann-Tsong et al.: "An Improved Data Flushing MAC Protocol for IEEE 802.11 Wireless Ad Hoc Network," VTC 2002-Fall. 2002 IEEE 56th Vehicular Technology Conference Proceedings. Vancouver, Canada, Sep. 24-28, 2002; [IEEE Vehicular Technolgy Conference], New York, NY: IEEE, US, vol. 4, (Sep. 24, 2002), pp. 2435-2439; XP010608871; ISBN: 978-0-7803-7467-6 the whole document.

Shou-Chih Lo, et al., "An Efficient Multipolling Mechanism forIEEE 802.11 Wireless LANs", Computers, IEEE Transactions on, IEEE, Jun. 30, 2003, vol. 52, Issue 6, p. 764-778.

Taiwan Search Report—TW094102744—TIPO—Feb. 2, 2012.

TGn Sync Complete Proposal, IEEE 802.11-04/888r13, IEEE mentor, Jul. 8, 2005.

TIA/EIA-95-B "Mobile Station-Base Station Compatibility Standard for Wideband Spread Spectrum Cellular Systems", Mar. 1999, XP-002145331.

TIA/EIA/IS-856-A, cdma2000 High Rate Packet Data Air Interface Specification, (Revision of TIA/EIA/IS-856), Apr. 2004.

TR-45.5 Physical Layer Standard for cdma2000 Spread Spectrum Systems, 3GPP2 C.S000-2D, Version 1.0, Feb. 13, 2004.

TR-45.5 "Physical Layer Standard for cdma2000 Spread Spectrum Systems", (the IS-2000 standard).

Won-Tae et al., : "MMAC : An Efficient WMATM MAC for Multicast Communications", Global Telecommunications Conference—Globecom '99, IEEE , pp. 587-591. Dec. 5-9, 1999.

Written Opinion, PCT/US2005/003576, International Searching Authority, European Patent Office, Jul. 28, 2005.

\* cited by examiner

DISTRIBUTED HIERARCHICAL SCHEDULING IN AN AD HOC NETWORK

CLAIM OF PRIORITY UNDER 35 U.S.C. §119

The present application for patent is a continuation of U.S. application Ser. No. 11/044,539, filed Jan. 26, 2005, entitled "Distributed Hierarchical Scheduling In An Ad Hoc Network" and claims priority to Provisional Application No. 60/540,504 entitled "Distributed Hierarchical Scheduling" filed Jan. 29, 2004, and assigned to the assignee hereof and hereby expressly incorporated by reference herein.

BACKGROUND

1. Field

The present invention relates generally to communications, and more specifically to distributed hierarchical scheduling in an ad hoc network.

2. Background

Wireless communication systems are widely deployed to provide various types of communication such as voice and data. A typical wireless data system, or network, provides multiple users access to one or more shared resources. A system may use a variety of multiple access techniques such as Frequency Division Multiplexing (FDM), Time Division Multiplexing (TDM), Code Division Multiplexing (CDM), and others.

Example wireless networks include cellular-based data systems. The following are several such examples: (1) the "TIA/EIA-95-B Mobile Station-Base Station Compatibility Standard for Dual-Mode Wideband Spread Spectrum Cellular System" (the IS-95 standard), (2) the standard offered by a consortium named "3rd Generation Partnership Project" (3GPP) and embodied in a set of documents including Document Nos. 3G TS 25.211, 3G TS 25.212, 3G TS 25.213, and 3G TS 25.214 (the W-CDMA standard), (3) the standard offered by a consortium named "3rd Generation Partnership Project 2" (3GPP2) and embodied in "TR-45.5 Physical Layer Standard for cdma2000 Spread Spectrum Systems" (the IS-2000 standard), and (4) the high data rate (HDR) system that conforms to the TIA/EIA/IS-856 standard (the IS-856 standard).

Other examples of wireless systems include Wireless Local Area Networks (WLANs) such as described in the IEEE 802.11 standards (e.g. 802.11 (a), (b), or (g)). Improvements over these networks may be achieved in deploying a Multiple Input Multiple Output (MIMO) WLAN comprising Orthogonal Frequency Division Multiplexing (OFDM) modulation techniques.

WLANs are commonly deployed to provide data services to one or more user terminals within an area. A cellular-like deployment of WLAN coverage areas may be deployed with an access point providing coverage for each cell. This nominal cellular architecture assumes that each access point has wired backhaul connectivity (e.g. a T1 backhaul). For example, 802.11 hotspots with a T1 backhaul are commonly deployed in various locations to provide access. A typical cellular-like WLAN deployment is illustrated in FIG. 1. In this example, data links 110A-C connect Internet 102 with Access Points (APs) 104A-C. Each access point 104 has a coverage area, commonly referred to as a cell 130, in which various User Terminals (UTs) 106 may communicate with the access point 104 via a wireless link 120.

Due to the limited cell radius and dense deployment of APs, as well as the expense, limited bandwidth and limited availability of T1 backhaul, alternate methods of backhaul are of interest. Various ad hoc networks may be formed. For example, consider a multi-hop wireless backhaul architecture, where APs form a peer-to-peer mesh network. In such a hierarchical architecture, only the APs, and not the user terminals (UTs) supported by each AP, participate in the backbone mesh. An earlier, similar approach is the Ricochet model, developed by Metricom Inc., of San Jose, Calif., now owned by YDI Wireless, Inc., of Falls Church, Va. In order to enable a mesh network, protocols are needed to establish communication between nodes in the mesh, also needed are techniques for scheduling reception and transmission to maximize throughput and/or minimize interference between mesh nodes and/or user terminals communicating via the mesh network. There is therefore a need in the art for distributed hierarchical scheduling in an ad hoc network.

SUMMARY

According to one aspect, an apparatus is described which includes a receiver for receiving one or more signals from one or more remote devices, a message decoder for decoding one or more first interference lists from coordination messages contained in the one or more received signals from respective one or more remote devices, and a memory for storing the one or more first interference lists and a second interference list comprising identifiers associated with the one or more remote devices.

According to another aspect, a method is provided for detecting signals received from one or more remote stations, identifying the one or more remote stations, storing an identifier associated with each of the one or more remote stations in a first interference list, and transmitting the first interference list for reception by neighbor remote stations.

According to another aspect, an apparatus is described which includes means for detecting signals received from one or more remote stations, means for identifying the one or more remote stations, means for storing an identifier associated with each of the one or more remote stations in a first interference list, and means for transmitting the first interference list for reception by neighbor remote stations.

According to another aspect, an apparatus is described which includes a receiver for receiving one or more signals from one or more remote devices, a message decoder for decoding one or more first interference lists and one or more remote allocations from coordination messages contained in the one or more received signals from respective one or more remote devices, and means for allocating a shared resource for receiving and transmitting by one or more remote devices in response to the one or more first interference lists and one or more remote allocations.

According to another aspect, a message is disclosed, operable for transmission by a mesh station in a hierarchically distributed mesh network, comprising an interference list field comprising a list of interfering remote stations, a transmit allocation field comprising one or more allocations for transmission by a child remote station on a shared medium, and a receive allocation field comprising one or more allocations for receiving by a child remote station on a shared medium.

According to another aspect, a mesh network is disclosed comprising: a first mesh station for establishing a superframe and transmitting a first coordination message, the first coordination message identifying the superframe and comprising one or more allocations; and one or more second mesh stations for receiving the first coordination message, and transmitting or receiving in accordance with the one or more allocations.

According to another aspect, computer readable media is disclosed operable to perform detecting signals received from one or more remote stations, identifying the one or more remote stations, storing an identifier associated with each of the one or more remote stations in a first interference list, and transmitting the first interference list for reception by neighbor remote stations.

Various other aspects and embodiments are also disclosed.

DETAILED DESCRIPTION

Figure 1:
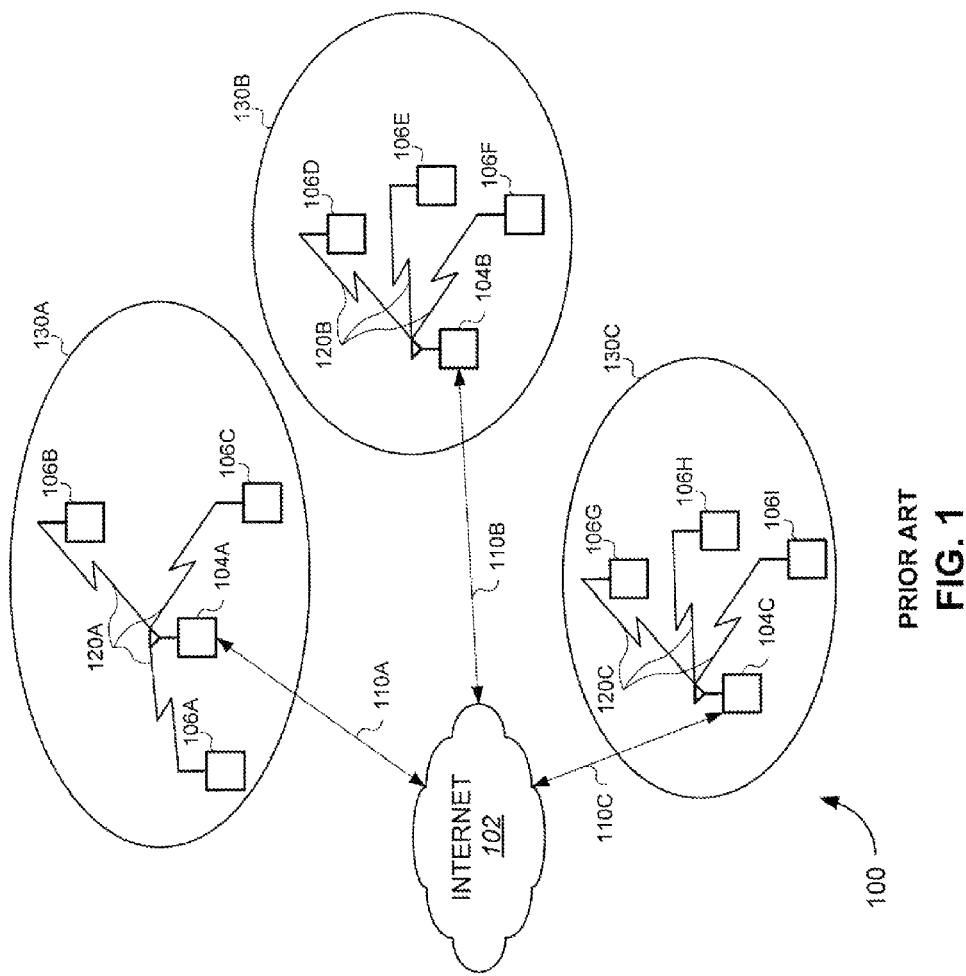
FIG. 1 is an example of a prior art WLAN cellular-like system.

Distributed ad hoc network embodiments utilizing hierarchical scheduling are detailed herein. When used as a supplement to or replacement for traditional wired backhaul "hotspot" topologies, expense and traffic bottlenecks may be avoided. A typical ad hoc network, such as a mesh network of peer stations, may share a single frequency or shared medium. Alternatively, more than one frequency may be used by a wireless mesh network. For example, one or more frequencies may be used for backhaul, and one or more alternate frequencies may be used for access by user terminals. A backhaul may be deployed using any communication format or comply to any standard, including those examples listed above, and may be modified to comply with one or more techniques detailed herein. Thus, any physical layer and/or Media Access Control (MAC) protocol may be adapted for use with techniques described herein. In one example, an ad hoc wireless mesh network of peer access points may be deployed to provide backhaul, as described below. User terminal to access point communication may be performed between any nodes of the backhaul mesh and user terminals deployed throughout the coverage area using any WLAN standard (e.g. an 802.11 standard, of any variant). In another embodiment, all stations, whether an AP or a UT, may be described as a Backhaul Mesh Station (BMS), and may be part of the backhaul mesh (e.g., similar to AP functionality) or may be solely a leaf node (e.g., similar to UT functionality). A wireless communication device may comprise all or a subset of the described functionality. For example, a powered station with multiple antennas may be well suited to provide connectivity to adjacent nodes, as well as form a portion of a wireless backhaul. A battery powered handheld user terminal, for example, may be deployed solely as a leaf node, or provide a limited amount of backhaul connectivity. These and other embodiments are detailed further below.

The wireless backhaul mesh aggregates traffic to a level 0 BMS, and distributes traffic from the level 0 BMS to nodes throughout the mesh. The level 0 BMS, detailed further below, may be connected to an external network (such as the Internet, or another intranet, whether wired or wireless; e.g. a network Point-of-Presence POP). The traffic flowing up and down the hierarchical mesh network is scheduled to avoid interference, when possible, to increase throughput.

Example embodiments are disclosed herein that support highly efficient operation in conjunction with very high bit rate physical layers for an ad hoc wireless LAN (or similar applications that use newly emerging transmission technologies). The example WLAN supports bit rates in excess of 100 Mbps (million bits per second) in bandwidths of 20 MHz. While wireless backhauls of high bandwidth are desirable, the techniques disclosed herein apply with any throughput rates.

An example embodiment supports high data rate, high bandwidth physical layer transport mechanisms in general, including, but not limited to, those based on OFDM modulation, single carrier modulation techniques, systems using multiple transmit and multiple receive antennas (Multiple Input Multiple Output (MIMO) systems, including Multiple Input Single Output (MISO) systems) for very high bandwidth efficiency operation, systems using multiple transmit and receive antennas in conjunction with spatial multiplexing techniques to transmit data to or from multiple user terminals during the same time interval, and systems using code division multiple access (CDMA) techniques to allow transmissions for multiple users simultaneously.

One or more exemplary embodiments described herein are set forth in the context of a wireless data communication system. While use within this context is advantageous, different embodiments of the invention may be incorporated in different environments or configurations. In general, the various systems described herein may be formed using software-controlled processors, integrated circuits, or discrete logic. The data, instructions, commands, information, signals, symbols, and chips that may be referenced throughout the application are advantageously represented by voltages, currents, electromagnetic waves, magnetic fields or particles, optical fields or particles, or a combination thereof. In addition, the blocks shown in each block diagram may represent hardware or method steps. Method steps can be interchanged without departing from the scope of the present invention. The word "exemplary" is used herein to mean "serving as an example, instance, or illustration." Any embodiment described herein as "exemplary" is not necessarily to be construed as preferred or advantageous over other embodiments.

FIG. 1 is an example of a prior art cellular-like system 100, comprising one or more Access Points (APs) 104 connected to one or more User Terminals (UTs) 106. Each AP and its associated UTs communicate via a Wireless Local Area Network (WLAN) 120. In the example embodiment, WLAN 120 is a high speed MIMO OFDM system. However, WLAN 120 may be any wireless LAN. Access point 104 communicates with any number of external devices or processes via network 102. Network 102 may be the Internet, an intranet, or any other wired, wireless, or optical network. Connection 110 carries the physical layer signals from the network to the access point 104. Devices or processes may be connected to network 102 or as UTs (or via connections therewith) on WLAN 120. Examples of devices that may be connected to either network 102 or WLAN 120 include phones, Personal Digital Assistants (PDAs), computers of various types (laptops, personal computers, workstations, terminals of any type), video devices such as cameras, camcorders, web cams, and virtually any other type of data device. Processes may include voice, video, data communications, etc. Various data streams may have varying transmission requirements, which may be accommodated by using varying Quality of Service (QoS) techniques.

System 100, as shown in FIG. 1 is deployed with a centralized AP 104. All UTs 106 communicate with the AP in this prior art example. In the example embodiment, this system may be modified to accommodate direct peer-to-peer communication between two UTs, in order to form a mesh network, as illustrated in FIG. 2 below.

Figure 2:
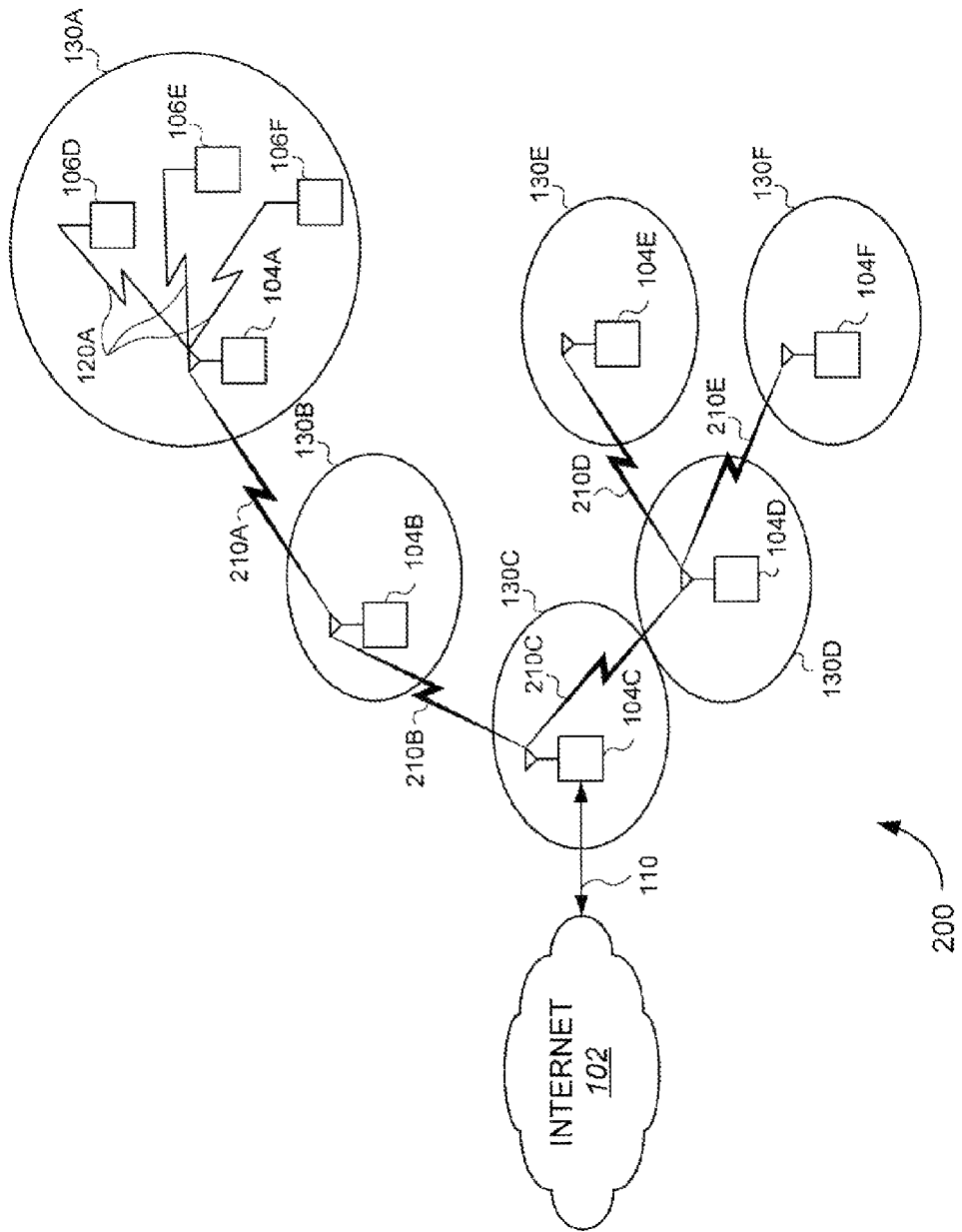
FIG. 2 illustrates an example embodiment of a system deploying a mesh network backhaul.

FIG. 2 illustrates an example embodiment of a system 200 deploying a mesh network backhaul for communication between various user terminals 106 as well as connections to devices through wired or wireless backhaul connection 110 (which connects the wireless backhaul to an external network 102 such as the Internet or other external network): In FIG. 2, as with FIG. 1, various access points 104 provide coverage over a geographic region or cell 130 in which various user terminals 120 may communicate with the access point via wireless links 120. In contrast with FIG. 1, an access point may not have a direct connection to an external network such as the Internet 102. In this example, access point 104C is connected to an external network via connection 110. All the other access points 104 are connected through a backhaul link, or mesh link 210. In this example, access point 104C connects with access points 104B and 104D. Access point 104A communicates with access point 104B via mesh link 210A. Thus, user terminals 106, associated with access point 104A in cell 130A may connect to the external network via a path formed through the mesh network using mesh links 210A and 210B. Thus, as will be detailed further below, an access point may communicate with a parent access point as well as one or more child access points. Furthermore, an access point may have user terminals, which may also be considered children. To avoid confusion in terminology, since each AP is just a station in the backbone mesh, when discussing procedures on the backbone mesh, an AP or UT may be referred to as a backbone mesh station (BMS). Various other cells 130 may also comprise one or more user terminals communicating with their respective access points, details not shown. System 200 serves to illustrate one embodiment of a mesh network using an AP for a BMS.

Figure 3:
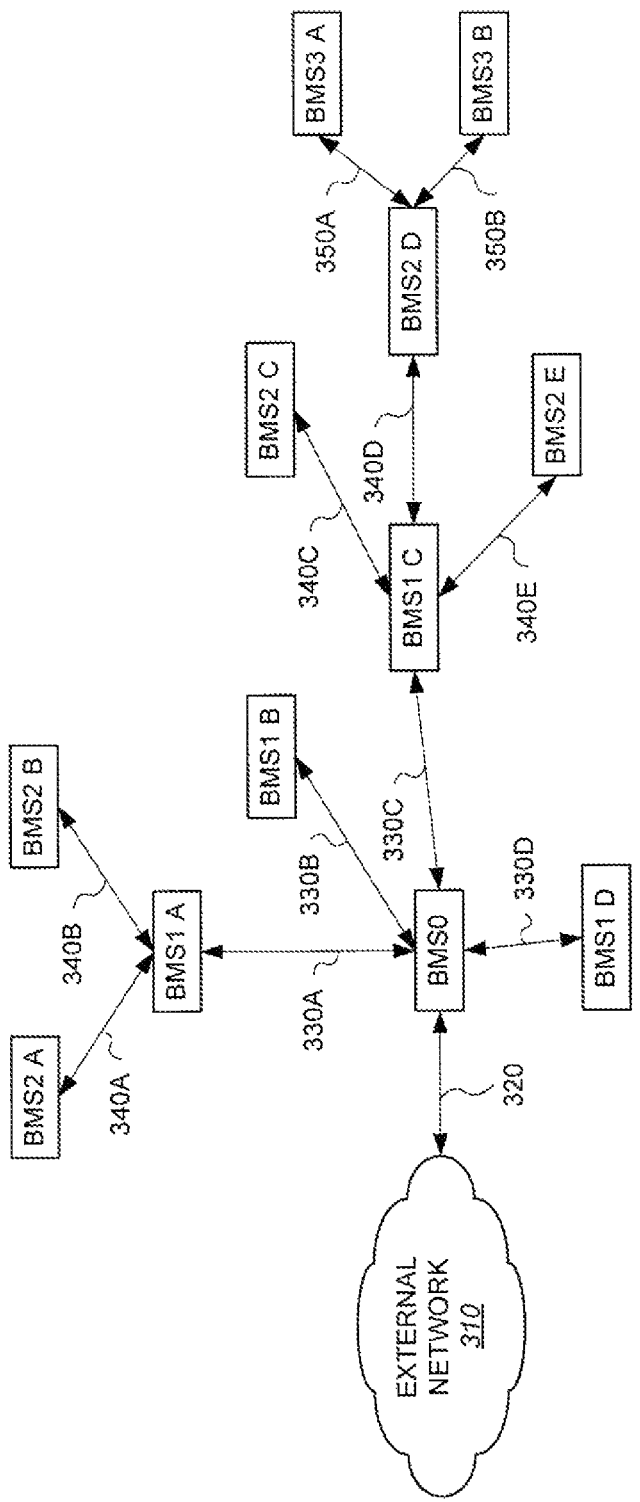
FIG. 3 illustrates a more generalized example of system comprising generalized BMS mesh.

FIG. 3 illustrates a more generalized example of system 300 comprising a generalized BMS mesh connected to an external network 310 via connection 320. Note that connection 310 or 320 may be wired or wireless, as described above. In this example, each node in the mesh is called a backbone mesh station (BMS). Each BMS may be described as having a level within the hierarchical tree structure formed. For example, level zero BMS, BMS0, is connected to the external network 310 as a point-of-presence (POP). In an example embodiment, the level 0 BMS is a POP in a wired network. In general, the connection to the external network may be formed using any communication standard, wired or wireless. Each level 1 BMS is one hop away from the level 0 BMS. In this example, BMS1 A-D are connected in the mesh to BMS0 in the mesh via mesh links 330A-D. Each BMS except for the root, (or level 0) BMS has a parent BMS and possibly one or more children. For example, BMS1 A communicates with level 2 BMSs, BMS2 A-B, via mesh links 340A-B respectively.

Note that the wireless links used within the mesh network may use any wireless technology, known in the art, including techniques such as those described in the aforementioned standards, modified, as detailed herein. Mesh networking standards and technologies are well known for wired networks, for example, the Internet, and those techniques can be applied to wireless mesh networks as well, with appropriate modification (examples include routing, discovery, packet forwarding, domain name services, DHCP, and the like). Additional examples are known, and are disclosed in various Internet protocols, including the Internet Control Message Protocol (ICMP), the ICMP Router-Discovery Protocol (IRDP), the Routing Information Protocol (RIP), and the Open Shortest Path First (OSPF) protocol.

In the example embodiment, the mesh network employs MIMO-OFDM techniques. Further, a BMS may communicate to one or more associated devices, such as user terminals, on alternate frequencies or other alternate channel, using any type of wireless link and/or communication standard. Or, the user terminal may be simply considered a child or leaf node in the mesh and may communicate on the mesh network itself.

In one example (as described above with respect to FIG. 2), a BMS is an access point. User terminals would associate with each BMS within that access point's cell for connectivity. In an alternate embodiment, a user terminal may also function as a BMS. The UT may form part of the wireless backhaul, and may also associate with other user terminals to provide access. As will be detailed further below, various BMSs may provide varying levels of support and features. For example, a BMS deployed with typical features of an access point, such as a steady power supply, multiple antennas, etc., may provide for higher power transmission, higher bandwidths, and so forth. A BMS deployed with features common to a mobile user terminal, such as a remote station cellular phone, PDA, etc., and may exhibit features such as fewer antennas, battery power, limited size, and the like, may support a subset of the features available on other BMSs. There are various additional application scenarios for the hierarchical scheduling scheme. All stations (APs or UTs) that share the same frequency allocation (e.g. use the same band) may become a part of the mesh and may be referred to as BMSs. A mix of APs and UTs may be deployed, or a mesh consisting of UTs only may be deployed. In this case, a particular UT becomes the Level 0 BMS and the remaining UTs organize in a hierarchical tree structure around the Level 0 BMS. In general, a set of BMSs may include APs, UTs or any combination thereof. Any BMS may be a parent, child, or both. Those of skill in the art will readily deploy myriad combinations of BMSs in light of the teaching herein.

Returning to FIG. 3, a level 1 BMS, BMS1 C communicates to three level 2 BMSs, BMS2 C-E, via mesh links 340C-E. In this example, BMS2 C and BMS2 E are leaf BMSs. BMS2 D further communicates with level 3 BMSs, BMS3 A-B, via mesh links 350A-B, respectively.

In one embodiment, a primary motivation may be to supply a wireless backbone mesh for a network of APs. Notice that the throughput requirements for backhaul increase rapidly with increased aggregation. Thus, the BMS that provides a fixed network point-of-presence (POP) carries the aggregate throughput of several APs. The high throughput requirement on the backbone can be achieved through the use of MIMO at the BMSs. In terms of size and location, the BMSs may run on line power, may be of larger size, and may be equipped with 4 or more antennas (for example). This allows the BMSs to operate with higher transmit power and may not require sophisticated sleep cycles to conserve battery power. All these features may be combined to allow for high efficiency and high throughput on the mesh backbone.

In one embodiment, due to larger range requirement for inter-BMS communication, it may be desirable to use a lower frequency band (e.g. the 2.4 GHz unlicensed band or a 2.3 GHz licensed band) for the BMS mesh Frequency Allocation (FA). However, the increased range from the MIMO allows the mesh FA to be in the 5 GHz band (which has lower range than the 2.4 GHz band) but may be preferable due to lower interference. High availability (low outage) may be desirable for backhaul, since the backhaul network supports the aggregate traffic of many users. Note that the mesh itself provides reliability through redundant routes, since a level 2 BMS can find two-hop connectivity through more than one level 1 BMS in case of failure of the parent device.

Thus, a set of BMSs form a mesh network in which "adjacent" BMSs can communicate with each other. When all BMSs share a common frequency allocation, communication on inter-BMS links may cause interference at other inter-BMS links. Distributed hierarchical scheduling, described herein, is designed to provide interference avoidance on the mesh.

A tree topology is well-suited for efficient transport of broadcast and multicast traffic which may be of interest for wide area networking. Broadcast and multicast traffic may be scheduled in the same manner as unicast traffic in the backbone mesh, as detailed further below. In a richly connected mesh of another configuration, additional procedures would need to be defined to construct a tree topology for broadcast and multicast, but in embodiments detailed herein, the tree topology is already available.

In one embodiment, it may be convenient to use CSMA/CA and the ad hoc networking concepts from the 802.11 distributed coordination function (DCF) for initial access and discovery of new BMSs on the mesh backbone. However, the high throughput requirements for the mesh backbone may make the use of 802.11 DCF inefficient. Although the DCF may be suitable for a mesh network, DCF procedures do not exploit either the hierarchical structure of the backbone, nor the knowledge about mutual interferers that can be made available from other transmissions within the mesh. Distributed hierarchical scheduling allows for these advantages.

Figure 4:
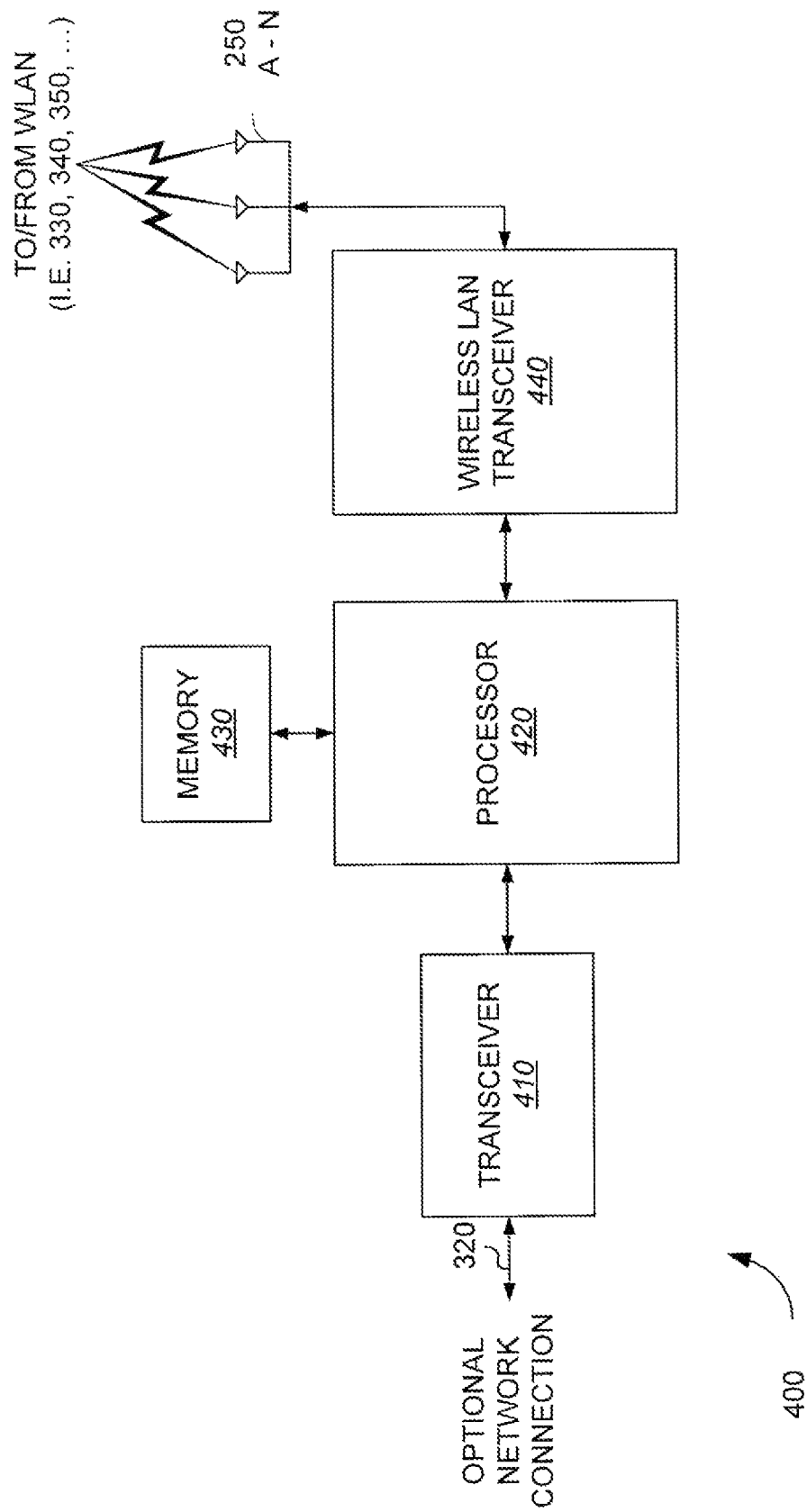
FIG. 4 depicts an example embodiment of a wireless communication device.

FIG. 4 depicts an example embodiment of a wireless communication device 400, which may be configured as a BMS, such as an access point 104 or user terminal 106. Transceiver 410, used in a level 0 BMS, receives and transmits on connection 320 according to the physical layer requirements of network 310. Data from or to devices or applications connected to network 310 are delivered to processor 420.

Processor 420 receives data, signals, messages, etc. from WLAN transceiver 440 (or transceiver 410 in a level 0 BMS). Received data may be processed for transmission on another link, such as a mesh link, or on a WLAN (when serving as an AP). Media Access Control (MAC) processing may be performed in processor 420. Internal control and signaling is also communicated between BMSs. MAC Protocol Data Units (MAC PDUs), also referred to as Physical layer (PHY) Protocol Data Units (PPDUs), or frames (in 802.11 parlance) may be delivered to and received from wireless LAN transceiver 240.

In an example embodiment, the Adaptation layer (ADAP) and Data Link Control layer (DLC) are performed in processor 420. The physical layer (PHY) is performed on wireless LAN transceiver 440, in conjunction with processor 420. Those of skill in the art will recognize that segmentation of the various functions may be made in any of a variety of configurations. Processor 420 may perform some or all of the processing for the physical layer. A wireless LAN transceiver may include a processor for performing MAC processing, or subparts thereof. Any number of processors, special purpose hardware, or combination thereof may be deployed.

Processor 420 may be a general-purpose microprocessor, a digital signal processor (DSP), or a special-purpose processor. Processor 420 may be connected with special-purpose hardware to assist in various tasks (details not shown). Various applications may be run on externally connected processors, such as an externally connected computer (or over a network connection), may run on an additional processor within wireless communication device 400 (not shown), or may run on processor 420 itself. Processor 420 is shown connected with memory 430, which may be used for storing data as well as instructions for performing the various procedures and methods described herein. Those of skill in the art will recognize that memory 430 may be comprised of one or more memory components of various types, that may be embedded in whole or in part within processor 420.

Wireless LAN transceiver 440 may be any type of transceiver (including any type of receiver and/or transmitter). In an example embodiment, wireless LAN transceiver 440 is an OFDM transceiver, which may be operated with a MIMO or MISO interface. OFDM, MIMO, and MISO are known to those of skill in the art. Various example OFDM, MIMO and MISO transceivers are detailed in co-pending U.S. patent application Ser. No. 10/650,295, entitled "FREQUENCY-INDEPENDENT SPATIAL-PROCESSING FOR WIDEBAND MISO AND MIMO SYSTEMS", filed Aug. 27, 2003, assigned to the assignee of the present invention. Alternate embodiments may include SIMO or SISO systems. An example receiver may comprise RF conversion components, (such as filters, amplifiers, mixers, oscillators, phase-locked loop, analog-digital converters, etc.), demodulators, RAKE receivers, equalizers, decoders, deinterleavers, combiners, and other components well known in the art. Signals received at transceiver 440 may be demodulated according to one or more communication designs or standards. In an example embodiment, a demodulator capable of demodulating MIMO OFDM signals is deployed. In alternate embodiments, alternate standards may be supported, and embodiments may support multiple communication formats.

Transmitted signals are formatted in transceiver 440 according to one or more wireless system standards or designs, such as those listed above. Examples of components that may be included in transceiver 440 are amplifiers, filters, digital-to-analog (D/A) converters, radio frequency (RF) converters, and the like. Data and control channels may be formatted for transmission in accordance with a variety of formats. Data for transmission on the forward link data channel may be formatted in a modulator (not shown) according to a rate and modulation format indicated by a scheduling algorithm. Examples of other components that may be incorporated in a transmitter of a transceiver 440 include encoders, interleavers, spreaders, and modulators of various types.

Wireless LAN transceiver 440 is shown connected with antennas 250 A-N. Any number of antennas may be supported in various embodiments. Antennas 250 may be used to transmit and receive on various WLANs, including mesh links (e.g. 330, 340, 350, etc.).

Wireless LAN transceiver 440 may comprise a spatial processor connected to each of the one or more antennas 250. The spatial processor may process the data for transmission independently for each antenna or jointly process the received signals on all antennas. Examples of the independent processing may be based on channel estimates, feedback from a remote station, such as a UT or other BMS, channel inversion, or a variety of other techniques known in the art. The processing is performed using any of a variety of spatial processing techniques. Various transceivers of this type may use beam forming, beam steering, eigen-steering, or other spatial techniques to increase throughput to and from a given user terminal. In an example embodiment, in which OFDM symbols are transmitted, the spatial processor may comprise sub-spatial processors for processing each of the OFDM subchannels, or bins.

In an example system, a first BMS may have N antennas, and a second BMS may have M antennas. There are thus M×N paths between the antennas of the first BMS and second BMS. A variety of spatial techniques for improving throughput using these multiple paths are known in the art. In a Space Time Transmit Diversity (STTD) system (also referred to herein as "diversity"), transmission data is formatted and encoded and sent across all the antennas as a single stream of data. With M transmit antennas and N receive antennas there may be MIN (M, N) independent channels that may be formed. Spatial multiplexing exploits these independent paths and may transmit different data on each of the independent paths, to increase the transmission rate.

Various techniques are known for learning or adapting to the characteristics of the channel between the two BMSs. Unique pilots may be transmitted from each transmit antenna. The pilots are received at each receive antenna and measured. Channel state information feedback may then be returned to the transmitting device for use in transmission. Eigen decomposition of the measured channel matrix may be performed to determine the channel eigenmodes. An alternate technique, to avoid eigen decomposition of the channel matrix at the receiver, is to use eigen-steering of the pilot and data to simplify spatial processing at the receiver.

Thus, depending on the current channel conditions, varying data rates may be available for transmission to various user terminals or other BMS throughout the system. The wireless LAN transceiver 440 may determine the supportable rate based on whichever spatial processing is being used for the physical link.

The number of antennas may be deployed depending on the BMS data needs as well as size and form factor. For example, a high definition video display may comprise, for example, four antennas, due to its high bandwidth requirements, while a PDA may be satisfied with two. An example BMS access point may have four antennas.

The following distributed scheduling procedures may be deployed for efficient scheduling on a hierarchical architecture, described above, e.g., the mesh backbone. These procedures are based on several observations: Much of the traffic in the mesh backbone flows upstream from the BMSs to the BMS-POP and downstream from the BMS-POP to the BMSs. The aggregate throughput at the BMS POP is typically a large fraction of the total throughput on the backbone mesh. A tree topology is well suited to this traffic flow, in contrast to a general inter-connected mesh network. The BMS-POP is at the root of the tree, as detailed above. Each BMS in the tree structure communicates with its (one) parent BMS and its (one or more) child BMSs.

Figure 5:
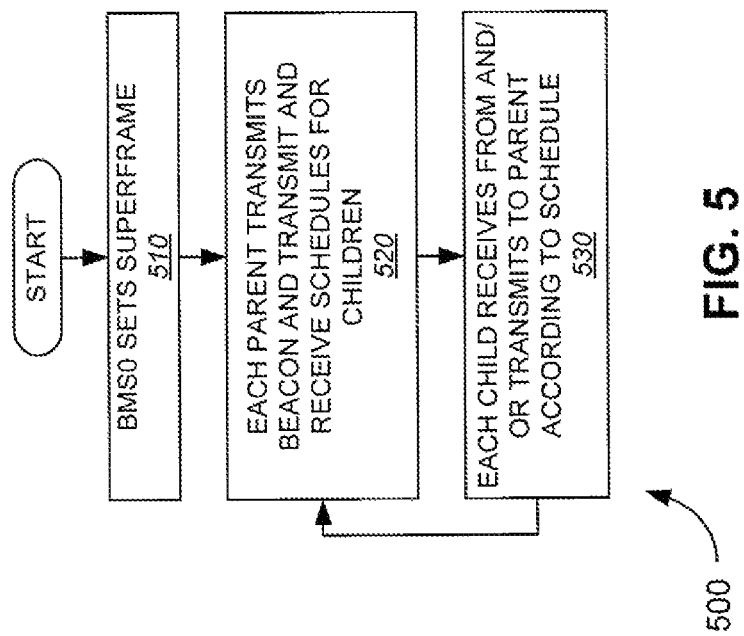
FIG. 5 depicts an example embodiment of a method for transmitting and receiving on a mesh network.

FIG. 5 depicts an example embodiment of a method 500 for transmitting and receiving on a mesh network. At 510, a root BMS, or level 0 BMS, sets a superframe. An example superframe is illustrated below with respect to FIG. 6. The superframe duration becomes the superframe duration for the entire mesh. The level 0 BMS begins the superframe transmission with a beacon followed by a coordination message, detailed further below.

At 520, each parent in the mesh transmits a beacon, as well as transmit and receive schedules for their children. Each parent announces its transmission and reception schedule in its beacon. Each child is assigned a time to receive transmissions from its parent and a time to transmit to the parent. This includes the Level 0 BMS, as well as all BMSs along the tree structure of the mesh. At 530, each child receives from its parent and/or transmits to its parent according to the schedule transmitted. The process may then return to 520 and repeat indefinitely using the superframe set up at 510. (The root BMS may modify the superframe, as in 510, as necessary.)

Figure 6:
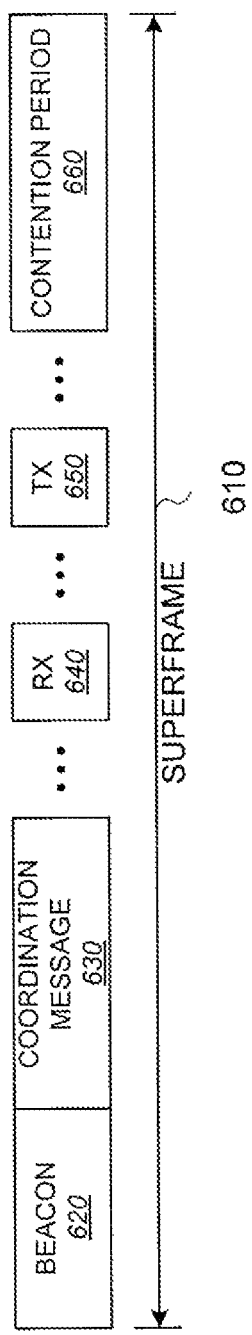
FIG. 6 illustrates an example embodiment of a superframe.

FIG. 6 illustrates an example embodiment of a superframe 610. Superframe 610 comprises a beacon 620, which may comprise various signals and/or messages commonly transmitted in WLAN beacons, well known in the art. A coordination message 630 is also transmitted in superframe 610. In this example, coordination message 630 is transmitted directly subsequent to beacon 620. In alternate embodiments, the coordination message may be transmitted in alternate locations within the superframe. The coordination message may also be included as part of beacon 620, which may include various other signals and/or messages. The coordination message, examples of which are detailed further below, may include system information, the superframe period and start time, a contention period (if applicable), an interference list (described below), and transmit and receive schedules for communication between the BMS and its children. An allocation of superframe 610 for reception from children, identified as RX 640, as well as an allocation for transmission to children, identified as TX 650, are illustrated in FIG. 6. In general, when the allocations within a superframe are identified within a coordination message 630, that coordination message should be transmitted prior to those allocations. In an alternate embodiment, a coordination message may indicate parameters for a subsequent superframe, and the corresponding allocation within the current superframe may have been announced in a coordination message in the previous superframe. As described above, note that a contention period 660 may be allocated within the superframe.

In one embodiment, the Level 0 BMS schedules its transmissions to/from the Level 1 BMSs and announces the schedule in its coordination message. The Level 0 BMS needs to make sure that this schedule occupies only a fraction of the superframe, the fraction selected to allow for transmission throughout the rest of the mesh. In one embodiment, the permitted fraction is a value between 0.4 and 0.9 and is a function of the number of levels of hierarchy in the mesh. Various scheduling techniques may be used for determining the amount of transmission and/or reception within the superframe at any given level. Example scheduling techniques are illustrated further below.

A small portion of the superframe may be set aside by the Level 0 BMS as a contention period. The length of the superframe and the position of the contention period is indicated in each coordination message. During the contention period, in the example embodiment, newly arriving BMSs use the distributed coordination function (DCF) procedures of 802.11 to communicate with an existing BMS in the mesh with a request to join the mesh. Various messages may be used for association with a BMS, and for setting up parent/child relationships within the mesh. Examples are detailed further below. Before the new BMS can make a request in one embodiment, it should listen to the beacons for several superframes and choose the BMS at the highest level of hierarchy (lowest numerical level) whose coordination message it can receive. If the request is accepted by a Level N BMS, the new BMS will become a Level N+1 BMS and follow the procedures described herein.

The superframe illustrated in FIG. 6 shows beacon 620 at the beginning of superframe. This is consistent a level 0 superframe, in the example embodiment. The superframe defined by the level 0 BMS will be used by all parent BMSs within the mesh. However, the beacon for each respective parent may be in different locations within the superframe, in accordance with allocations for transmission for that BMS, as illustrated further below.

Figure 7:
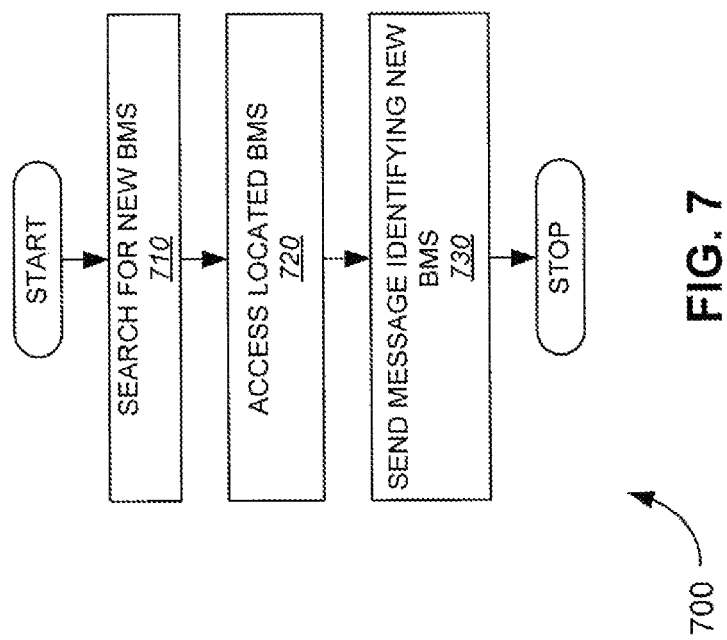
FIG. 7 illustrates an example embodiment of a method for adding a BMS within the mesh network tree.

FIG. 7 illustrates an example embodiment of a method 700 for adding a BMS within the mesh network tree. At 710, a device, either a user terminal, access point, or other device, (generally referred to as a BMS), desiring to become a part of the mesh network, searches for a BMS within the mesh network. As described above, it may listen to beacons for a period of time to determine the BMS at the highest level of hierarchy from which a coordination message is received. Once identified, the device may access that located potential parent BMS, at 720. For example, the contention period may be used for attempting access. The BMS may send a message requesting addition to the tree to the potential parent BMS. This request may be allowed or denied. If the request is allowed, the BMS will become a child of the parent BMS and transmit and receive in accordance with the coordination message from the parent BMS (and may perform other functions, as detailed below). If the access is denied, the BMS may attempt access with another BMS within a mesh (e.g. a node further down the tree) and attempt to establish a connection therewith (details not shown). At 730, a device may transmit a message identifying the new BMS (or may transmit the information in another message). While this step is optional, it may be used to allow the mesh to expand. When a device associates with a BMS, and broadcasts the ID of the new BMS, there may be one or more adjacent stations (perhaps forming another mesh), nearby, unaware of the new BMS (or its mesh). The adjacent stations may then join the mesh, perhaps as children of the newly joining device.

Each BMS attempts to receive all available beacons being transmitted in the mesh. If a BMS is able to hear the beacon of another BMS, then the two BMSs are tier 1 interferers (whether or not they have a parent-child relationship). Each BMS maintains a tier 1 interference list (T1IL). The T1IL is constructed locally based on received beacons. Scheduling is determined in accordance with determined constraints. Some constraints are determined with interference lists. There are tier 1 and tier 2 interference list constraints, described below.

Tier 1 interference list constraints may be generated as follows. An interference list may contain a list of identifiers, each identifier associated with a remote device such as a BMS. An example identifier for inclusion in an interference list is a device ID, which may be transmitted by a device in a beacon (or other message or signal). When any BMS in the T1IL of BMS X transmits, it interferes with reception at BMS X. Therefore, scheduled transmissions at a BMS in the T1IL become constraints on the receive schedule at BMS X. Similarly, when BMS X transmits, it may interfere with reception at each BMS in its T1IL. Therefore, scheduled transmissions to a BMS in the T1IL become constraints on the transmit schedule at BMS X.

Tier 2 interference list constraints may be generated as follows. Each BMS includes its T1IL in its beacon. The receiving BMS includes the transmitting BMS in its T1IL and stores the received T1IL from that BMS as a tier 2 interference list (T2IL) associated with the transmitting BMS. Since each BMS is only responsible for establishing its transmit and receive schedule to its children, only the T2IL of its children is needed. (However, the T2IL for the other BMSs in the T1IL may be useful to provide fast recovery in case a non-child BMS on the T1IL becomes an orphan and wants to become a child to reestablish connectivity.)

Figure 8:
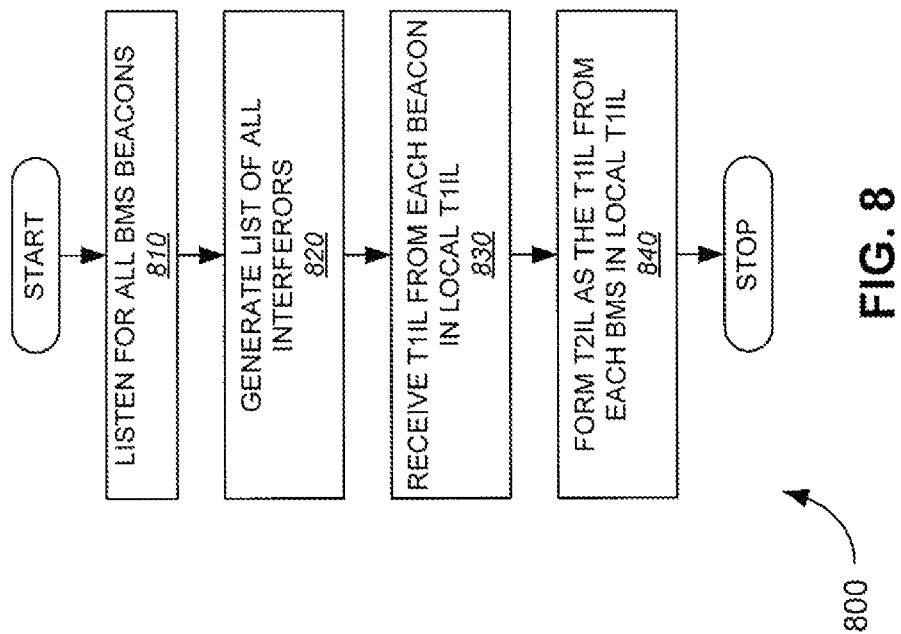
FIG. 8 depicts an example embodiment of a method for generating interference lists.

FIG. 8 depicts an example embodiment of a method 800 for generating interference lists. As detailed further below, interference lists comprise identifiers of various other transmitting stations such as BMSs (including access points, user terminals, and other devices), which provide interference to a particular BMS. Two types of interference lists are described in the example embodiment, a Tier 1 interference list for identifying interferers of a BMS, and Tier 2 interference lists comprising tier 1 interference lists from one or more BMSs included in its tier 1 interference list. These interference lists, as described below, may be used for scheduling to reduce interference and increase throughput in the network mesh.

At 810, a BMS listens for all BMS beacons. At 820, a list of all interferers is generated, consisting of BMSs for which a beacon is received. The T1IL will be transmitted to neighboring stations, including the parent BMS, if any. For example, the T1IL may be included in a coordination message (e.g. coordination message 630, detailed further below with respect to FIG. 12). At 830, the BMS receives a tier 1 interference list from each beacon in its tier 1 interference list (or the local T1IL). At 840, form the T2IL as the T1IL received from each child BMS in the local T1IL. Note that the T2IL may alternately be formed containing the T1IL from each BMS in the local T1IL (not limited to those from child BMSs). In this alternative, although the BMS need not schedule for non-children, maintaining the T2IL may be used for transitioning an interferer to a child, should the parent of that interferer become unavailable for any reason.

Figure 9:
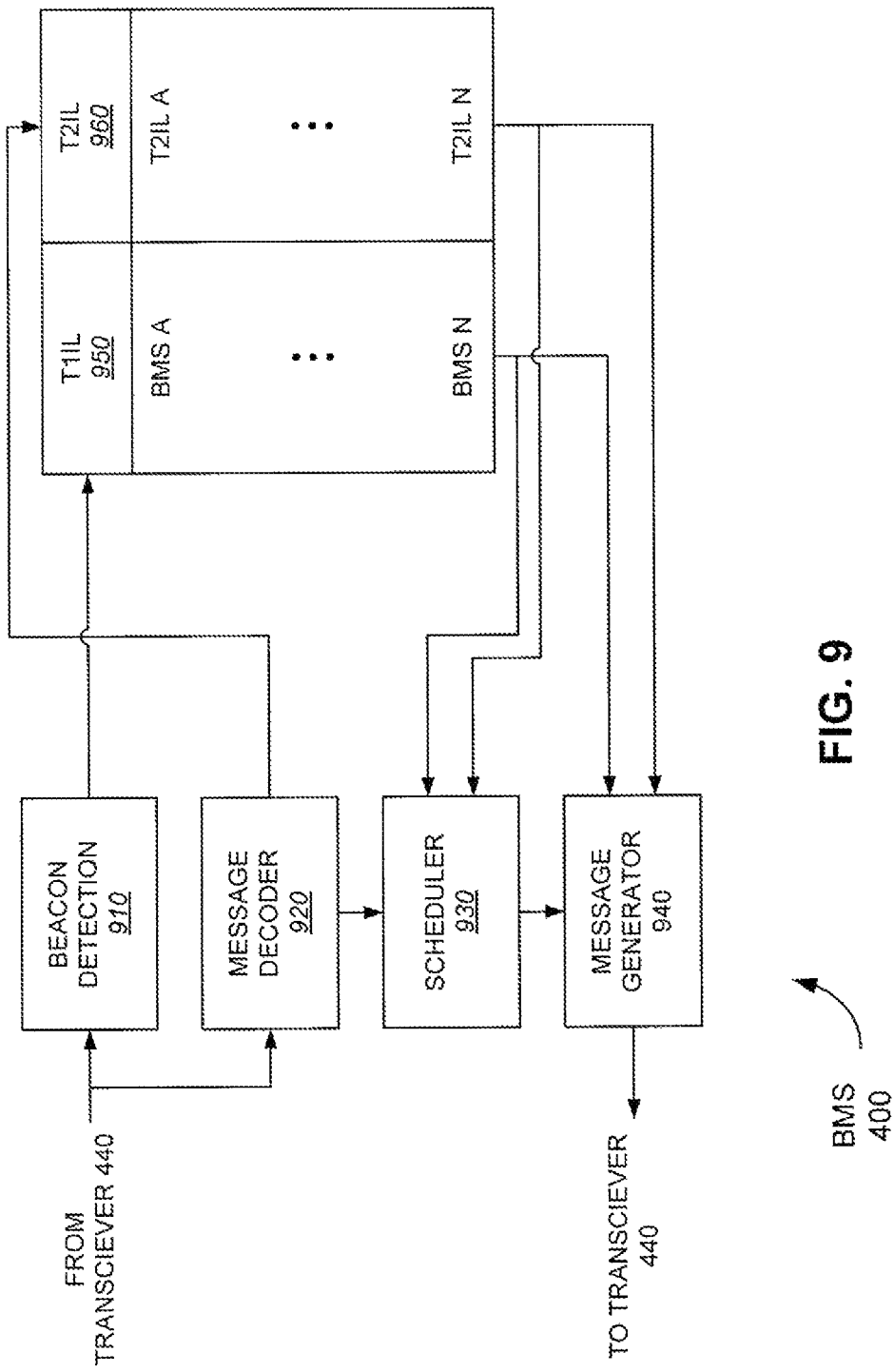
FIG. 9 illustrates an illustrative portion of an example embodiment of a BMS.

FIG. 9 illustrates a portion of an example embodiment of a BMS 400. The various functional blocks shown are illustrative only and may be deployed, as described above, as discrete logic, functions or processes of a processor (e.g. processor 420), in association with storage, such as memory 430, or any combination thereof. In this example, signals are received from a transceiver, such as transceiver 440, and beacon detection block 910 may be used to identify local BMSs from which a beacon may be detected. These BMSs form the tier 1 interference list 950 as shown. Beacon detection block 910 may include any device for detecting a beacon signal (e.g., measuring received signal strength, searching, decoding, deinterleaving, filtering, or any other signal processing techniques, well known in the art). The beacon detection will identify the existence of an interferer, and the interferer's identity. Various parameters may be defined for determining the existence of an interferer. For example, a minimum received signal strength may be required to categorize a BMS as an interferer. Note that, in alternate embodiments, a BMS identifier need not be contained in a beacon signal. The BMS may be identified using any variety of techniques (e.g. characteristics of the received signal, such as a code or offset used for or applied to a pilot signal) or included in a signal or message other than the beacon. A beacon detection block 910, in such an alternate embodiment, will decode the respective signal or message, or determine the identifying characteristic of the signal for identifying the interfering BMS, and the identity may be stored in the T1IL 950.

Message decoder 920 is used to decode messages received from a remote station, such as a BMS. An example message (such as a coordination message) may include the tier 1 interference list. In the example embodiment, the coordination message and the beacons from these BMSs comprise the tier 1 interference list for those BMSs, and are decoded in message decoder 920 for inclusion in the tier 2 interference list 960, as shown. Message decoder 920 may also receive information within the coordination message from the parent BMS, if any. That information may be used in scheduler 930 to determine transmission and reception schedules, illustrated further below.

A message decoder may be deployed using any combination of discrete logic or processing functions, as described above. A message decoder may receive a signal from a receiver or transceiver, and that signal may have been processed using any number of signal processing techniques, such as RF downconversion, amplification, filtering, analog-to-digital conversion, error correction, decoding, deinterleaving, and the like. The message decoder may also include one or more of those functions. The message decoder, examples of which are well known in the art, may be used to extract various fields of information from messages carried on one or more channels (which channels may be of differing formats). The data extracted from the fields may be made available for further processing (by a processor, as described, or by other logic). As described above, the T2IL 960 may comprise the T1IL associated with each child (and need not include those associated with non-child interferers).

Scheduler 930 also may access the tier 1 and tier 2 interference lists as shown, for use in scheduling. Scheduler 930 is shown connected to message generator 940, which generates messages for transmission, such as on transceiver 440. A message generator 940 may be deployed using any combination of discrete logic or processing functions, as described above. The message formed may be included, with or without other messages, in one or more channels for transmission according to any transmission scheme, examples of which are detailed above, and of which numerous examples are well known in the art. The message may be an aggregation of various fields of data, examples of which are detailed below (an example of which is a coordination message 630).

Various other messages are known in the art, and may be used within the scope of the present invention. For example, messages for requesting and admitting or denying association with a BMS may be deployed. Acknowledgement (ACK or NAK) messages may be included in various communication formats. A message for identifying a newly detected potential mesh node may be transmitted, as described above. Various messages for establishing or providing status about the mesh, or traffic on the mesh may be formed. For example, a message may include information such as the number of hops to a known level 0 BMS through an identified BMS may be used for maintaining the mesh. The mesh may be adapted as mesh nodes are added or subtracted. Those of skill in the art will readily adapt the principles disclosed herein to any type of communication format and associated messaging format. The tier 1 and tier 2 interference lists are available to message generator 940. (The transmission of the tier 2 interference list may optionally be deployed in certain embodiments.)

Note that a leaf node need not comprise a scheduler, nor does it need to listen for an interference list from neighbors. A device configured as a leaf may simply monitor beacons to form an interference list, decode messages from the parent BMS to identify the receive and transmit allocations, and other functions as will be apparent to one of skill in the art in light of the teaching herein.

Figure 10:
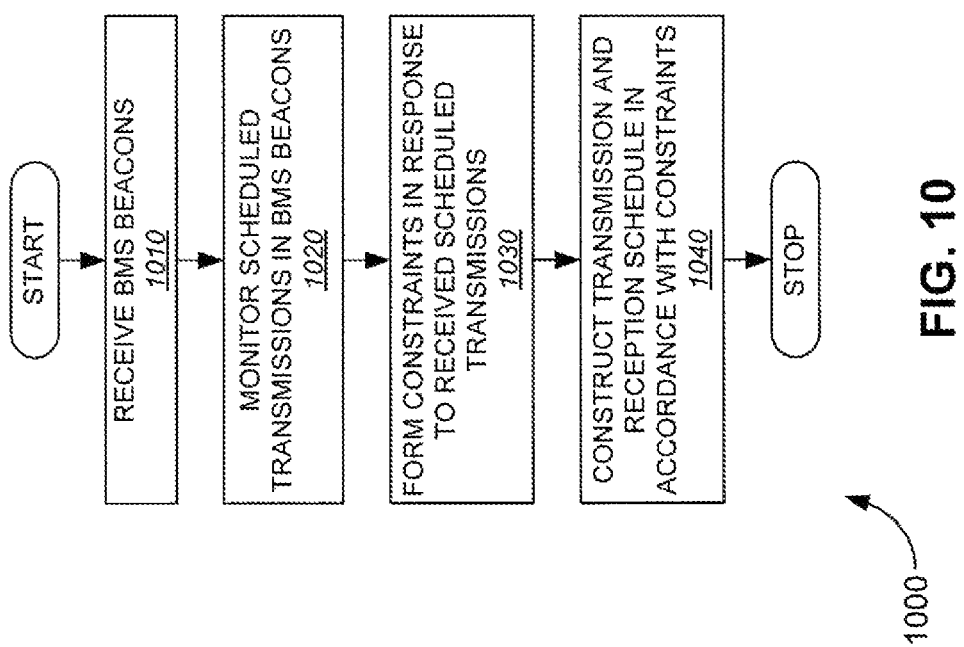
FIG. 10 illustrates an example embodiment of a method for forming transmission and reception schedules at a BMS.

FIG. 10 illustrates an example embodiment of a method 1000 for forming transmission and reception schedules at a BMS. At 1010, BMS beacons are received. In this context, the term beacon includes the transmission of a coordination message, including interference list and scheduling information.

At 1020, the BMS monitors schedule transmissions in the BMS beacons. Each beacon received at a BMS provides information about scheduled transmissions. The scheduling of a transmission or reception may be referred to as an allocation. An allocation may be indicated using any technique, examples of which are well known in the art. For example, an allocation may include a time during which a shared medium is to be accessed, and one or more addresses for identifying one or more transmitting and/or receiving stations (and/or source or destination addresses). The time may be identified by a start time and duration. Alternately, fixed durations may be previously identified, and a time indication may simply identify the duration (e.g. numbered time slots). Those of skill in the art will recognize myriad ways to indicate an allocation. Allocations may be included in a coordination message, examples of which are detailed below, which may be transmitted along with (or alternately as part of) a beacon, or may be transmitted at any other time. A BMS schedules allocations (either receive, transmit, or both) for its children. The allocation may be included in the coordination message.

When a BMS receives beacons (or, alternately, a coordination message) from a remote BMS (or other station), allocations contained therein may be referred to as remote scheduled allocations. A remote scheduled allocation, in conjunction with interference lists, may be used to generate constraints for use in distributed hierarchical scheduling, an example of which is detailed further below. Beacons received prior to the transmission of the BMSs beacon impose scheduling constraints on the BMS. In determining its transmissions to/from its children the BMS respects constraints from beacons received prior to the transmission of its beacon. At 1030, form constraints in response to receive scheduled transmissions.

At 1040, construct a transmission and reception schedule in accordance with the constraints. An example scheduling method is illustrated below with respect to FIG. 11. Once this scheduling has been performed, the appropriate coordination message may be transmitted to facilitate transmission and reception by the children of the BMS, as well as to provide information for local BMSs to avoid interfering with the BMS and its children. Except when it is transmitting, a BMS may continue to listen for other beacons to update its T1IL, as well as the T2IL associated with child T1IL BMSs. For efficient utilization, efficient reuse and reduced processing complexity at each BMS, it may be convenient to assume that the transmit and receive schedule announced in the beacon applies to a subsequent superframe (not the current superframe). However, the procedures defined here are also applicable to the case where the beacons schedule the current superframe. In summary, in this example, at each level of the hierarchy, the transmission of the beacon for a Level N BMS is scheduled by the parent (Level N−1 BMS). All beacons received by the Level N BMS allow the BMS to construct its T1IL and to associate a T2IL for each BMS in its T1IL (in particular, for each child). An example of T1IL and T2ILs at an arbitrary BMS is provided in Table 1 below. These lists are used to determine scheduling constraints at BMS k. Notice that the T1IL at BMS k consists of its children (m, n), its parent (p) as well as other BMSs (q) that do not have a parent/child relationship with k. BMS k stores the T2IL associated with BMS m which is the T1IL of BMS m reported in its beacon. All beacons received by the Level N BMS prior to the transmission of its beacon provide constraints to its transmit and receive schedule. Based on these constraints the Level N BMS determines its transmit and receive schedule to/from its (Level N+1 BMS) children and announces it in its beacon, which, in turn, provides the constraints on the schedule of the subsequent BMSs.

TABLE 1

Example Tier 1 and Tier 2 Interference List

| Tier 1Interference List (T1IL) at BMS k | Tier 2 Interference Lists (T2ILs) at BMS k |
|---|---|
| BMS m (child) | T2IL = {k, q}. This is the T1IL of BMS m |
| BMS n (child) | T2IL = {k, p, r, s}. This is the T1IL of BMS n |
| BMS p (parent) | T2IL = {k, g, n}. This is the T1IL of BMS p |
| BMS q | T2IL = {k, m). This is the T1IL of BMS q |

Figure 11:
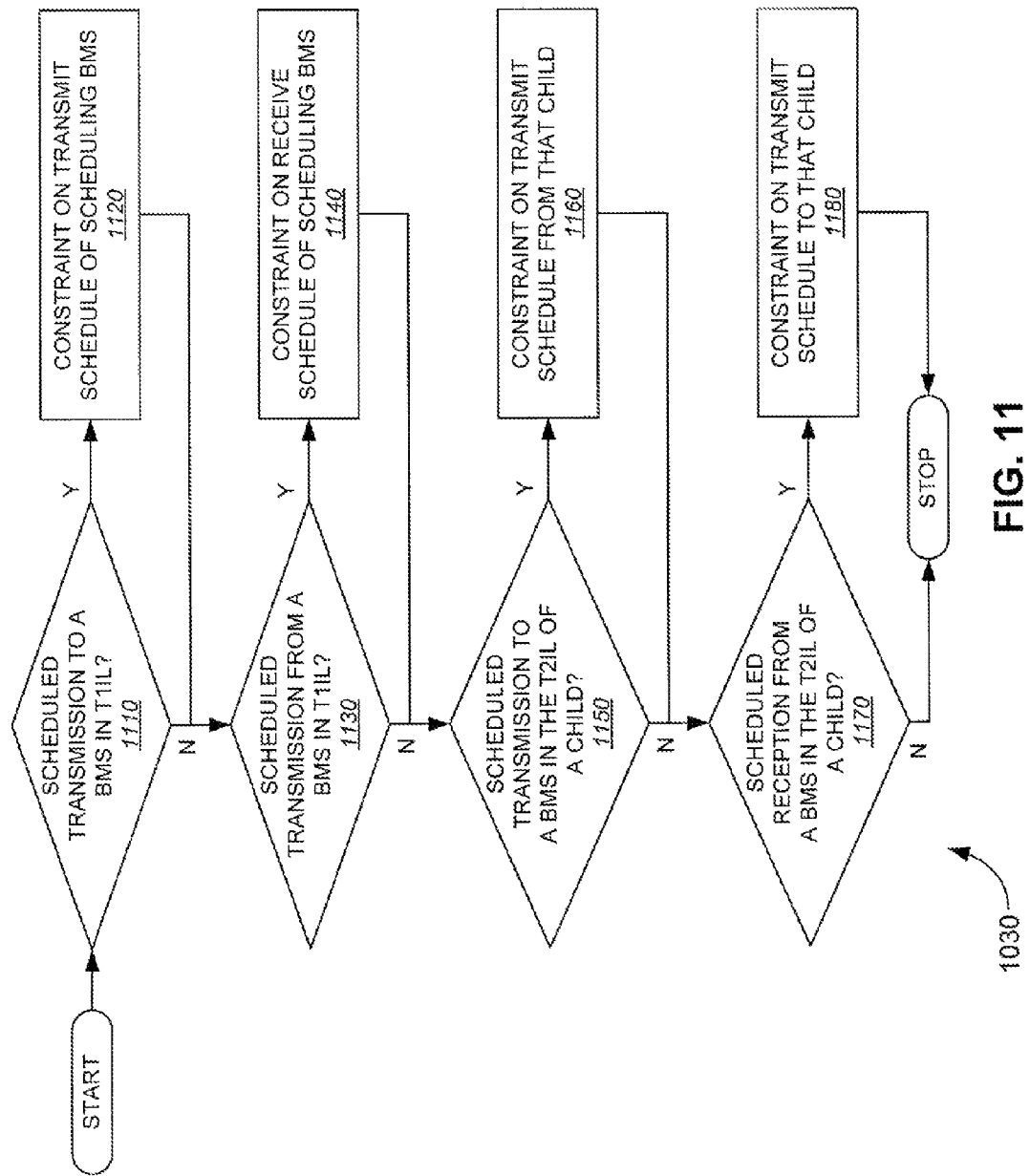
FIG. 11 illustrates an example embodiment of a method for forming constraints in response to received scheduled transmissions.

FIG. 11 illustrates an example embodiment of a method for forming constraints in response to received remote scheduled allocations, such as may be used at 1030, described above. At decision block 1110, if there is a remote scheduled transmission to a BMS in the tier 1 interference list of the scheduling BMS (which may be determined by monitoring the remote scheduled allocations, as described in 1020, for example), proceed to 1120, otherwise proceed to 1130. At 1120, place a constraint on the transmit schedule of the scheduling BMS. In other words, the scheduling BMS should not schedule a transmission from the scheduling BMS during such a remote scheduled transmission in order to avoid causing interference at the receiver of that remote scheduled transmission.

At 1130, if there is a remote scheduled transmission from a terminal in the scheduling BMS's tier 1 interference list, proceed to 1140, otherwise proceed to 1150. At 1140, place a constraint on the receive schedule of the scheduling BMS. In other words, the scheduling BMS should not schedule a reception (e.g. a transmission from one of its children to itself) during such a remote scheduled reception, since the reception of the transmission would interfere with remote scheduled reception from the terminal in its tier 1 interference list.

At 1150, determine if there is a scheduled transmission to a terminal in the tier 2 interference list of a child. If so, proceed to 1160, otherwise proceed to 1170. At 1160, place a constraint on a transmit schedule from that child. In other words, the tier 2 interference list associated with that child indicates interferers or potential interferers with that child. If a transmission is scheduled to one of those potential interferers, that child should not transmit, to avoid interference.

At 1170, determine if there is a scheduled reception from a terminal in the tier 2 interference list associated with a child. If so, proceed to 1180, otherwise the process may stop. At 1180, place a constraint on the transmission schedule to that child. In other words, if a terminal in the tier 2 interference list associated with a child (e.g. in a tier 1 interference list of the child) is to perform a transmission, a transmission should not be scheduled to that child, because it may not be received at the child without interference from the scheduled transmission from the other terminal.

Constraints may be introduced by remote scheduled allocations, as well as by allocations scheduled by the scheduling BMS. For example, an iterative process may be performed by the scheduling BMS, such that once an allocation is made to one child, one or more constraints may be introduced by that allocation (even if the allocation has not yet been transmitted). The scheduling BMS may perform the scheduling in any manner desired. For example, multiple schedule hypotheses may be generated. A schedule hypothesis may be selected based on increasing throughput, meeting service guarantees, or a combination of both. Various heuristic techniques may be deployed (for complicated mesh scheduling), or brute force techniques may be deployed (when the interference lists are relatively simple). The method 1030 (or any of the various equivalent methods, obvious to one of ordinary skill in the art, in light of the teaching herein), illustrated in FIG. 11, may be iterated repeatedly until the allocations for a superframe are generated. In other words, each allocation may be made in accordance with the existing constraints, then, if the allocation is successful within the constraints, that allocation becomes a scheduled transmission to determine additional constraints, if any.

Figure 12:
FIG. 12 illustrates an example coordination message.

A variety of beacons, coordination methods, and combinations thereof may be used. An example coordination message 630 is illustrated in FIG. 12. Various alternate embodiments will be apparent to one of ordinary skill in the art, in light of the teaching herein. In the example embodiment, the beacon and coordination message may be combined. The beacon, coordination message, or combination may include various other fields (not shown) or may omit various example fields detailed herein. The example coordination message transmitted by each Level N BMS contains the following information: a system identification (identifying the POP) 1210; a superframe period 1220 and start time 1230 (determined by the Level 0 BMS for the mesh); a contention period field 1240 for identifying the location of a contention period, if any; a Tier 1 Interference List (T1IL) 1250 including all BMSs whose beacons have been identified (e.g. decoded over the last predetermined time period, for example); a transmit schedule 1260 for transmissions from the BMS to the parent level (N−1) BMS and the child level (N+1) BMSs; and a receive schedule 1270 for transmissions to the parent level (N−1) BMS and the child level (N+1) BMSs. Tx 1260 and Rx 1270 are used to indicate scheduled allocations. Note that, as described above, the scheduled allocation from a scheduling BMS directs the traffic flow between itself and its children, and may also be used by other scheduling BMSs as a remote scheduled allocation in the scheduling by those other BMSs. Any type of allocation indication may be used in coordination message 630.

In this example, the system identification 1210, superframe period and start time 1220-30 and contention period 1240 propagate down the hierarchy (unchanged) throughout the mesh.

Occasionally, especially at lower levels of the hierarchy (higher values of N in a Level N BMS), conflicts may arise, e.g. interfering transmissions get scheduled at overlapping periods. In the example embodiment, because the total bandwidth requirements at the lower levels of the mesh hierarchy are relatively low (little or no aggregation of traffic from other APs), this is not a significant problem. When a BMS detects a collision during a scheduled reception from a child, it may modify its receive schedule for subsequent superframes. Otherwise, when a BMS detects a collision during a scheduled reception from its parent, it either notifies the parent about the collision or, if the child is unable to decode the beacon, it does not transmit its scheduled beacon. In either case, the parent modifies the schedule for subsequent superframes.

Figure 13:
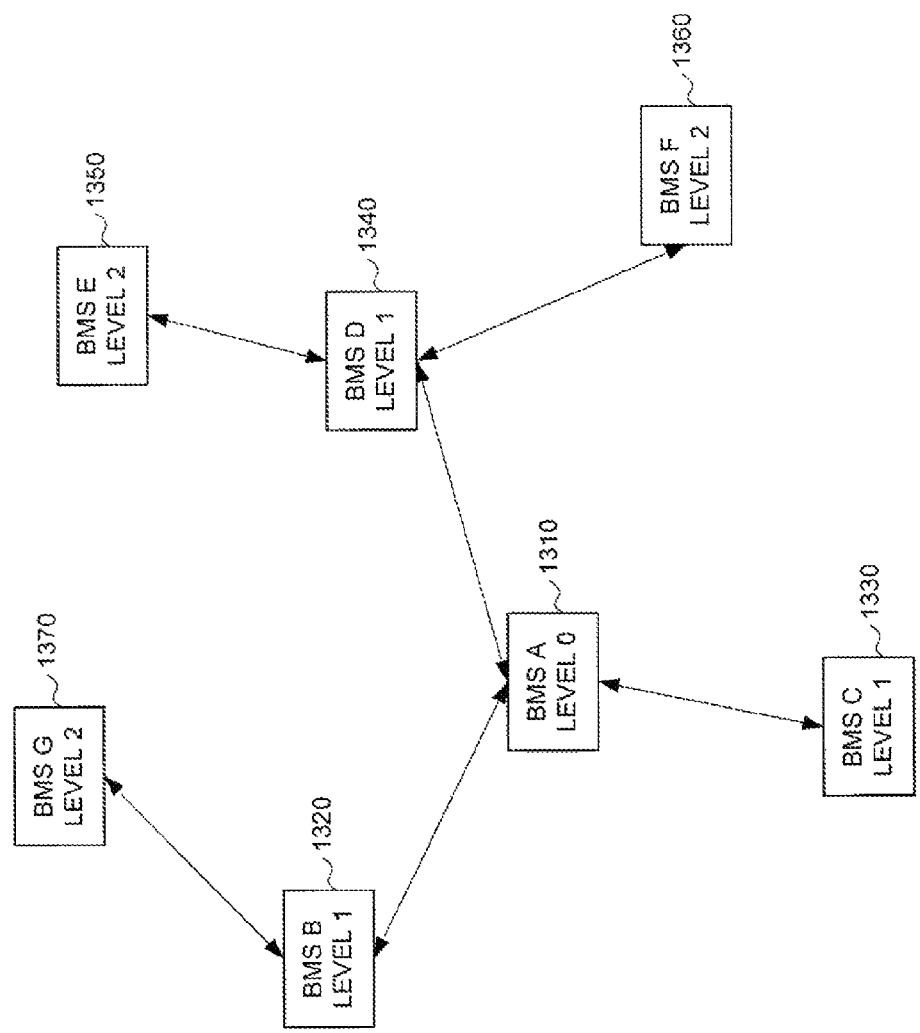
FIG. 13 illustrates an example mesh network.

The various embodiments described above may be illustrated with an extended example, using a simplified mesh topology as shown in FIG. 13. In this example, a mesh comprising seven BMSs on three levels is illustrated. BMS A 1310 is the level 0 BMS and has as children three level 1 BMSs, BMS B-D, 1320-40, respectively. Level 1 BMS B has one level 2 child, BMS G 1370. Level 1 BMS D 1340 has two children, BMS E-F, 1350-60, respectively.

Figure 14:
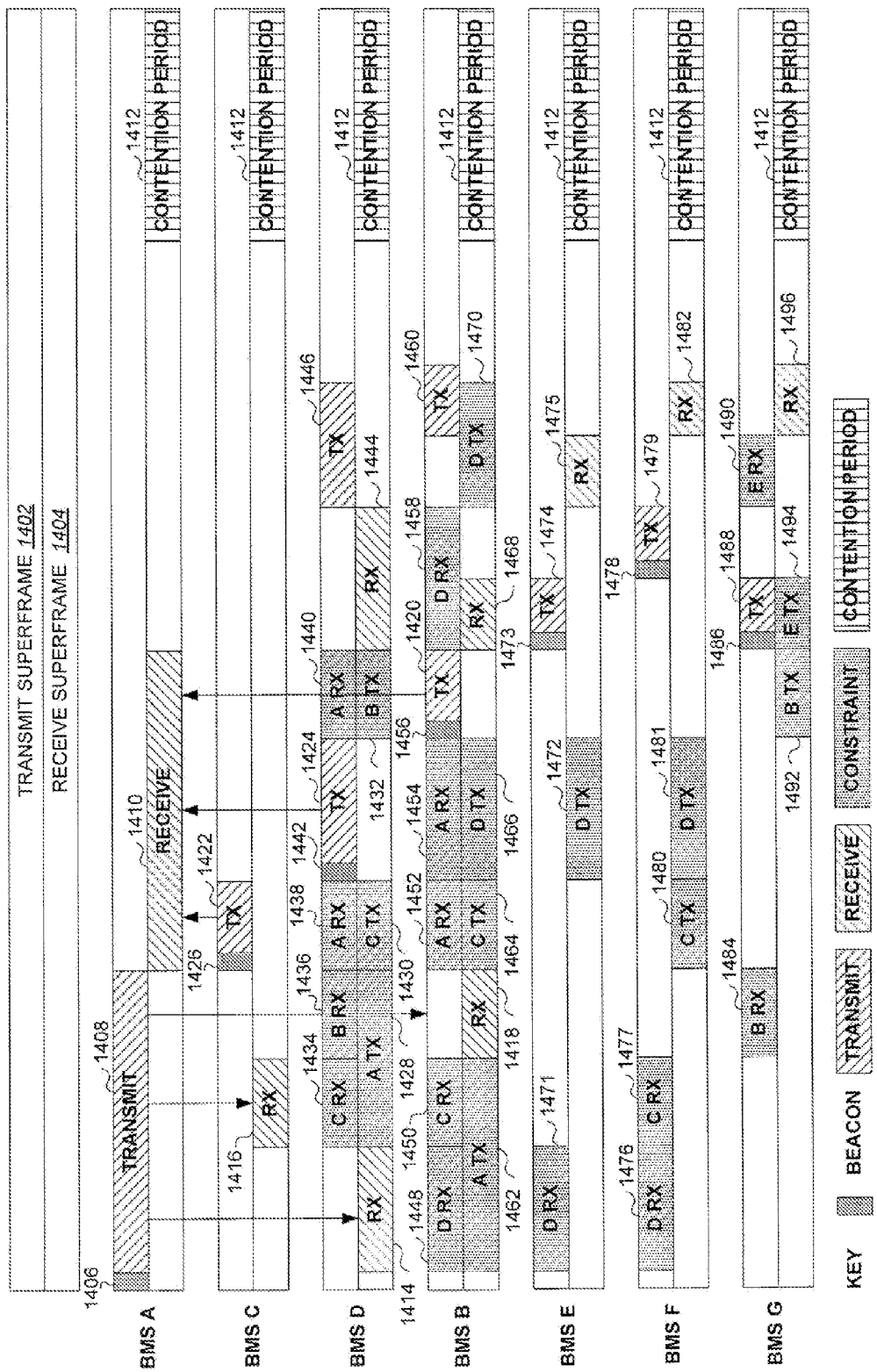
FIG. 14 illustrates an example superframe structure.

An example superframe structure and example procedures for the mesh, illustrated in FIG. 13, are illustrated in FIG. 14.

Superframe 610 is illustrated comprising a superframe 1402 and a receive superframe 1404. Transmission and reception during a superframe are then illustrated in corresponding brackets for the seven BMSs A-G, as shown. A key defines different shading patterns to illustrate each beacon, transmit allocations, receive allocations, constraints and the contention period. The constraints and allocations shown in FIG. 14 are illustrative only. Table 2 illustrates the tier 1 intereference lists for the various BMSs shown in FIG. 13.

TABLE 2

Example Tills

| BMS | Level | T1IL | Parent |
|-----|-------|------|--------|
| A | 0 | B, C, D | — |
| B | 1 | A, C, D, G | A |
| C | 1 | A, B, D, F | A |
| D | 1 | A, B, C, E, F | A |
| E | 2 | D, G | D |
| F | 2 | C, D | D |
| G | 2 | B, E | B |

The superframe in FIG. 14 begins with the Level 0 BMS (BMS A) transmitting its beacon 1406. The beacon defines the length of the superframe, the position of the BMS A transmit 1408 and receive 1410 periods to each Level 1 BMS: B, C and D, and the position of the contention period 1412.

Level 1 BMS B, C and D hear the BMS A beacon 1406 which informs them of their schedule for transmit and receive to BMS A. BMS B receives at 1418 and transmits to BMS A at 1420. BMS C receives at 1416 and transmits to BMS A at 1422. BMS D receives at 1414 and transmits to BMS A at 1424. On receiving the beacon 1406, BMS B, C, D include the constraints in their transmit and receive schedule as shown in FIG. 14 (discussed further below). Note that according to the T1ILs, BMS E, F, G do not receive the beacon of BMS A.

BMS C has no child, so its schedule consists of communication with BMS A, which has been defined in the beacon of BMS A. So, BMS C requires no further processing. BMS C transmits its beacon 1426, which contains only its transmit and receive periods with its parent BMS A (1422 and 1416).

The beacon from BMS A 1406 defines transmissions from A to B, C, D and from B, C, D to A, which become receive schedule constraints for BMS D. These constraints are shown on the receive superframe of BMS D (1414 is the transmission from A to D, A TX 1428 identifies the constraint due to the transmission from A to B and C, C TX 1430 is the constraint due to C transmitting to A, and B TX 1432 is the constraint due to B transmitting to A). Similarly, receptions scheduled at A, B, C and included in the beacon from BMS A 1406 are shown as constraints on the transmit superframe of BMS D (1434 is the C RX constraint due to C receiving from A, 1436 is the B RX constraint due to B receiving from A, 1438 is the A RX constraint due to A receiving from C, and 1440 is the A RX constraint due to A receiving from B). BMS D needs to design its transmit and receive schedule to its children, BMS E and F, respecting these constraints. The transmit 1446 (D to E and F) and receive 1444 (E and F to D) schedule of BMS D to its children E and F is as shown, and is transmitted with beacon 1442.

BMS B is scheduled to transmit its beacon 1456 next. The transmit and receive periods announced by BMS D in its beacon provide further constraints to the schedule at BMS B. Thus the transmit period at BMS D (to BMS E and BMS F) becomes a receive schedule constraint 1470 at BMS B while the receive period at BMS D (from BMS E and BMS F) becomes a transmit constraint 1458 on BMS B. Notice that BMS D is not the parent of BMS B but its schedule constrains the schedule at BMS B because BMS D gets to transmit its beacon ahead of BMS B. These are additional constraints to those introduced due to the beacon from A (D RX 1448 due to D receiving from A, C RX 1450 due to C receiving from A, A RX 1452 due to A receiving from C, A RX 1454 due to A receiving from D, B transmitting to A 1420, A TX 1462 due to A transmitting to C and D, B receiving from A 1418, C TX 1464 due to C transmitting to A, and D TX 1466 due to D transmitting to A).

Moreover, BMS B is the parent of G and needs to schedule transmit and receive periods to G. From previously received beacons from G, B is aware that E is on the T1IL of G. This means that the transmit 1474 and receive periods 1475 from E (scheduled by E's parent D), respectively constrain the receive and transmit schedules from G to B. These constraints are shown on the superframe of BMS G in FIG. 14. Therefore B schedules its transmit period 1460 to and receive period 1468 from G to respect these constraints.

BMS E is a child in this example, and thus does not need to schedule. If that were to change, it would have a D RX constraint 1471 due to D receiving from A, and a D TX constraint 1472 due to D transmitting to A. BMS E transmits its beacon 1473 as shown. As scheduled, BMS E receives at 1475 and transmits at 1474.

BMS F is also a child in this example, and thus does not need to schedule. If that were to change, BMS F would have a D RX constraint 1476 due to D receiving from A, a C RX constraint 1477 due to C receiving from A, a C TX transmit constraint 1480 due to C transmitting to A, and a D TX constraint 1481 due to D transmitting to A. BMS F transmits its beacon 1478 as shown. As scheduled, BMS F receives at 1482 and transmits at 1479.

BMS G is also a child in this example, and thus does not need to schedule. If that were to change, BMS G would have a B RX constraint 1484 due to B receiving from A, an E RX constraint 1490 due to E receiving from D, a B TX transmit constraint 1492 due to B transmitting to A, and an E TX constraint 1494 due to E transmitting to D. BMS G transmits its beacon 1486 as shown. As scheduled, BMS G receives at 1496 and transmits at 1488.

Notice that through this distributed scheduling, overlapping transmissions have been scheduled: (G to B 1488 overlapping with E to D 1474) and (D to F 1446 overlapping with B to G 1460). Recall the interference lists from Table 2. Transmitter G is not in the T1IL for receiver D. Transmitter E is not on the T1IL of receiver B. Therefore these overlapping transmissions do not cause mutual interference. Similarly, transmitter D is not in the T1IL for receiver G. Transmitter B is not on the T1IL of receiver F. Therefore these overlapping transmissions do not cause mutual interference.

It is also apparent from FIG. 14 that the scheduling and reuse efficiency of the hierarchical scheduling procedure becomes even more significant when the mesh has further levels of hierarchy. In the example, notice the sparse transmit and receive constraints shown on the superframe schedules of BMSs E, F and G. Thus, if each of these BMS were itself a parent, it would have flexibility in scheduling the transmit and receive periods for its children without causing collisions at already scheduled transmissions. If the scheduling is for the same superframe, then that schedule needs to be accommodated in the part of the superframe that follows its beacon and prior to the contention period. However, if the scheduling is always done for subsequent superframes, then transmit and receive periods can be scheduled in the early part of the superframe (prior to the transmission of the beacon by the parent). This permits maximum flexibility and maximum efficiency.

Another case of interest is a network where the BMSs do not include the T1IL in their beacons. Therefore the parent cannot construct a T2IL for its children. Then, in the example of FIG. 13, BMS B is not aware that the scheduled transmit and receive periods at E place constraints on, respectively, the transmit and receive schedules at G. In such cases, it is possible that the parent (B) may attempt to be aggressive and schedule a transmission to/from its child (G) that results in collisions: e.g. overlapping periods with reception at E and transmission from G or vice versa. Such collisions may reduce efficiency. However, when such a collision is detected, the parent modifies the schedule for the subsequent superframe. By trial and error, a similar level of efficiency can be achieved. However, in some circumstances, inclusion of the T1IL in the beacon and the procedures described using the T2IL may yield a more effective scheme.

Another case of interest is when the BMS includes its T2IL in the beacon or coordination message. For example, consider the case that BMS D includes its T2IL in its coordination message (received by BMS A), which indicates that BMS G is "adjacent" to BMS E and BMS C is "adjacent" to BMS F. Fast recovery is enabled as follows. If BMS D goes down for any reason, BMS A does not receive its beacon. At this point, BMS A can immediately reorganize the tree by assigning BMS E to be a child of BMS G and BMS F to be child of BMS C. Thus inclusion of the T2IL in the coordination message enables fast recovery in the face of BMS failure.

Depending on the frequency of network topology changes and traffic changes, it is possible to reduce the overhead of coordination message transmissions. For example, in relatively stable networks, the coordination message need not be transmitted in every beacon period. The schedule may be left unchanged for a number of beacon periods. In highly dynamic networks where the BMS are not in fixed locations, there may be frequent changes in topology. In this case the coordination message may be transmitted in every beacon period and the tree topology and the schedule are updated frequently. In various alternate embodiments, coordination messages may be transmitted more or less frequently, and/or the frequency may be dynamically updated to adapt to changes in the network environment.

In summary, aspects detailed above yield various benefits, examples of which follow. An ad hoc mesh network may be organized into a tree topology that matches the traffic flow for the case of a wireless backhaul network. Distributed, hierarchical scheduling is provided where each parent schedules communication with its children while respecting already scheduled transmissions to/from its interferers and to/from interferers of its children. Efficient flow and procedures needed to construct interference constraints to accomplish the distributed, hierarchical scheduling are described. The result is very efficient scheduling and tight reuse in an ad hoc wireless network without the use of centralized scheduling.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a wireless communication device such as a user terminal, an access point, or mesh network node. In the alternative, the processor and the storage medium may reside as discrete components in a wireless communication device.

Headings are included herein for reference and to aid in locating various sections. These headings are not intended to limit the scope of the concepts described with respect thereto. Such concepts may have applicability throughout the entire specification.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of operating a parent mesh station within an ad-hoc mesh network, comprising:
  determining a first set of mesh stations that belong to the ad-hoc mesh network, wherein wireless transmissions from each of the first set of mesh stations is expected to directly interfere with wireless transmissions from the parent mesh station;

determining, for each of the first set of mesh stations, a second set of mesh stations that belong to the ad-hoc mesh network, wherein wireless transmissions from each of the second set of mesh stations is expected to directly interfere with wireless transmissions from the associated mesh station of the first set of mesh stations; and selectively constraining communications associated with a given mesh station among the first set of mesh stations based on a transmission schedule that includes one or more previously scheduled transmissions or receptions associated with the parent mesh station, the first set of mesh stations and/or the second set of mesh stations.

2. The method of claim 1, wherein the transmission schedule includes a given scheduled transmission to at least one of the first set of mesh stations.

3. The method of claim 2, wherein the selectively constraining step constrains transmissions from the parent mesh station so as not to interfere with the given scheduled transmission.

4. The method of claim 1, wherein the transmission schedule includes a given scheduled transmission from at least one of the first set of mesh stations.

5. The method of claim 4, wherein the selectively constraining step constrains a receive schedule at the parent mesh station so as not to interfere with the given scheduled transmission.

6. The method of claim 1, wherein the transmission schedule includes a given scheduled transmission to one of the mesh stations among the second set of mesh stations for the given mesh station.

7. The method of claim 6, wherein the selectively constraining step constrains transmissions from the given mesh station so as not to interfere with the given scheduled transmission.

8. The method of claim 1, wherein the transmission schedule includes a given scheduled transmission to the given mesh station from one of the mesh stations among the second set of mesh stations for the given mesh station.

9. The method of claim 8, wherein the selectively constraining step constrains a receive schedule at the given mesh station so as not to interfere with the given scheduled transmission.

10. The method of claim 1, further comprising:
monitoring beacon signals from the first set of mesh stations,
wherein the transmission schedule is determined from the monitored beacon signals.

11. A parent mesh station within an ad-hoc mesh network, comprising:
means for determining a first set of mesh stations that belong to the ad-hoc mesh network, wherein wireless transmissions from each of the first set of mesh stations are expected to directly interfere with wireless transmissions from the parent mesh station;
means for determining, for each of the first set of mesh stations, a second set of mesh stations that belong to the ad-hoc mesh network, wherein wireless transmissions from each of the second set of mesh stations are expected to directly interfere with wireless transmissions from the associated mesh station of the first set of mesh stations; and
means for selectively constraining communications associated with a given mesh station among the first set of mesh stations.

12. A parent mesh station within an ad-hoc mesh network, comprising:
logic configured to determine a first set of mesh stations that belong to the ad-hoc mesh network, wherein wireless transmissions from each of the first set of mesh stations are expected to directly interfere with wireless transmissions from the parent mesh station;
logic configured to determine, for each of the first set of mesh stations, a second set of mesh stations that belong to the ad-hoc mesh network, wherein wireless transmissions from each of the second set of mesh stations are expected to directly interfere with wireless transmissions from the associated mesh station of the first set of mesh stations; and
logic configured to selectively constrain communications associated with a given mesh station among the first set of mesh stations.

13. A non-transitory computer-readable storage medium containing instructions stored thereon, which, when executed by a parent mesh station within an ad-hoc mesh network, cause the parent mesh station to perform operations, the instructions comprising:
program code to determine a first set of mesh stations that belong to the ad-hoc mesh network, wherein wireless transmissions from each of the first set of mesh stations are expected to directly interfere with wireless transmissions from the parent mesh station;
program code to determine, for each of the first set of mesh stations, a second set of mesh stations that belong to the ad-hoc mesh network, wherein wireless transmissions from each of the second set of mesh stations are expected to directly interfere with wireless transmissions from the associated mesh station of the first set of mesh stations; and
program code to selectively constrain communications associated with a given mesh station among the first set of mesh stations.

14. A method of operating a mesh station within an ad-hoc mesh network, comprising:
generating an interference list field comprising a list of one or more interfering remote stations;
generating a transmit allocation field comprising one or more allocations for transmission, on a shared medium, by one or more child remote stations;
generating a receive allocation field comprising one or more allocations for receiving, on the shared medium, by the one or more child remote stations; and
forming a message including the interference list field, the transmit allocation field and the receive allocation field.

15. The method of claim 14, wherein the message further comprises a superframe identification field.

16. The method of claim 14, wherein the message further comprises a contention period field.

17. The method of claim 14, wherein the message further comprises a system identification field.

18. A mesh station within an ad-hoc mesh network, comprising:
means for generating an interference list field comprising a list of one or more interfering remote stations;
means for generating a transmit allocation field comprising one or more allocations for transmission, on a shared medium, by one or more child remote stations;

means for generating a receive allocation field comprising one or more allocations for receiving, on the shared medium, by the one or more child remote stations; and means for forming a message including the interference list field, the transmit allocation field and the receive allocation field.

19. A mesh station within an ad-hoc mesh network, comprising:

logic configured to generate an interference list field comprising a list of one or more interfering remote stations;

logic configured to generate a transmit allocation field comprising one or more allocations for transmission, on a shared medium, by one or more child remote stations;

logic configured to generate a receive allocation field comprising one or more allocations for receiving, on the shared medium, by the one or more child remote stations; and logic configured to form a message including the interference list field, the transmit allocation field and the receive allocation field.

20. A method of operating a mesh station within an ad-hoc mesh network, comprising:

establishing a superframe; and transmitting a coordination message to one or more other mesh stations within the ad-hoc mesh network, the first coordination message identifying the superframe and instructing the one or more other mesh stations to transmit and/or receive in accordance with one or more allocations, wherein the mesh station is associated with a first level in a hierarchy of levels in the ad-hoc mesh network and each of the one or more other mesh stations is associated with a second level in the hierarchy of levels in the ad-hoc mesh network, the first level being associated with a highest level indicative of a root level, and the second level being associated with a level lower than the first level.

21. The method of claim 20, further comprising:

transmitting a beacon signal prior to transmitting the coordination message.

22. The method of claim 20, wherein the mesh station is a root backhaul mesh station of the ad-hoc mesh network.

23. The method of claim 20, wherein establishing the superframe includes:

transmitting a period for the superframe and a start time for the superframe.

24. A method of operating a mesh station within an ad-hoc mesh network, comprising:

receiving a first coordination message from another mesh station within the ad-hoc mesh network, the first coordination message identifying a superframe and instructing the mesh station to transmit and/or receive in accordance with one or more first allocations; and transmitting and/or receiving in accordance with the one or more first allocations, wherein the mesh station is associated with a first level in a hierarchy of levels in the ad-hoc mesh network and the another mesh station is associated with a second level in the hierarchy of levels in the ad-hoc mesh network, the second level being associated with a highest level indicative of a root level, and the first level being associated with a level lower than the second level.

25. The method of claim 24, further comprising:

transmitting a second coordination message, the second coordination message identifying the superframe, and instructing one or more other mesh stations to transmit and/or receive in accordance with one or more second allocations, the one or more second allocations configured to avoid conflicting with the one or more first allocations in the first coordination message.

26. The method of claim 25, wherein each of the one or more other mesh stations is a child to the mesh station.

27. The method of claim 25, wherein conflicting with the one or more first allocations in the first coordination message corresponds to the one or more first allocations and the one or more second allocations being scheduled such that interfering transmissions are in overlapping time periods.

28. A mesh station within an ad-hoc mesh network, comprising:

means for establishing a superframe; and means for transmitting a coordination message to one or more other mesh stations within the ad-hoc mesh network, the first coordination message identifying the superframe and instructing the one or more other mesh stations to transmit and/or receive in accordance with one or more allocations, wherein the mesh station is associated with a first level in a hierarchy of levels in the ad-hoc mesh network and each of the one or more other mesh stations is associated with a second level in the hierarchy of levels in the ad-hoc mesh network, the first level being associated with a highest level indicative of a root level, and the second level being associated with a level lower than the first level.

29. A mesh station within an ad-hoc mesh network, comprising:

means for receiving a first coordination message from another mesh station within the ad-hoc mesh network, the first coordination message identifying a superframe and instructing the mesh station to transmit and/or receive in accordance with one or more first allocations; and means for transmitting and/or receiving in accordance with the one or more first allocations, wherein the mesh station is associated with a first level in a hierarchy of levels in the ad-hoc mesh network and the another mesh station is associated with a second level in the hierarchy of levels in the ad-hoc mesh network, the second level being associated with a highest level indicative of a root level, and the first level being associated with a level lower than the second level.

30. A mesh station within an ad-hoc mesh network, comprising:

logic configured to establish a superframe; and logic configured to transmit a coordination message to one or more other mesh stations within the ad-hoc mesh network, the first coordination message identifying the superframe and instructing the one or more other mesh stations to transmit and/or receive in accordance with one or more allocations, wherein the mesh station is associated with a first level in a hierarchy of levels in the ad-hoc mesh network and each of the one or more other mesh stations is associated with a second level in the hierarchy of levels in the ad-hoc mesh network, the first level being associated with a highest level indicative of a root level, and the second level being associated with a level lower than the first level.

31. A mesh station within an ad-hoc mesh network, comprising:

logic configured to receive a first coordination message from another mesh station within the ad-hoc mesh network, the first coordination message identifying a superframe and instructing the mesh station to transmit and/or receive in accordance with one or more first allocations; and logic configured to transmit and/or receiving in accordance with the one or more first allocations, wherein the mesh station is associated with a first level in a hierarchy of levels in the ad-hoc mesh network and the another mesh station is associated with a second level in the hierarchy of levels in the ad-hoc mesh network, the second level being associated with a highest level indicative of a root level, and the first level being associated with a level lower than the second level.

32. A non-transitory computer-readable storage medium containing instructions stored thereon, which, when executed by a mesh station within an ad-hoc mesh network, cause the mesh station to perform operations, the instructions comprising:

program code to establish a superframe; and program code to transmit a coordination message to one or more other mesh stations within the ad-hoc mesh network, the first coordination message identifying the superframe and instructing the one or more other mesh stations to transmit and/or receive in accordance with one or more allocations, wherein the mesh station is associated with a first level in a hierarchy of levels in the ad-hoc mesh network and each of the one or more other mesh stations is associated with a second level in the hierarchy of levels in the ad-hoc mesh network, the first level being associated with a highest level indicative of a root level, and the second level being associated with a level lower than the first level.

33. A non-transitory computer-readable storage medium containing instructions stored thereon, which, when executed by a mesh station within an ad-hoc mesh network, cause the mesh station to perform operations, the instructions comprising:

program code to receive a first coordination message from another mesh station within the ad-hoc mesh network, the first coordination message identifying a superframe and instructing the mesh station to transmit and/or receive in accordance with one or more first allocations; and program code to transmit and/or receiving in accordance with the one or more first allocations, wherein the mesh station is associated with a first level in a hierarchy of levels in the ad-hoc mesh network and the another mesh station is associated with a second level in the hierarchy of levels in the ad-hoc mesh network, the second level being associated with a highest level indicative of a root level, and the first level being associated with a level lower than the second level.

* * * * *